(12) United States Patent
Kishi et al.

(10) Patent No.: US 10,407,039 B2
(45) Date of Patent: Sep. 10, 2019

(54) BRAKE CONTROL APPARATUS

(71) Applicant: HITACHI AUTOMOTIVE SYSTEMS, LTD., Ibaraki (JP)

(72) Inventors: Minoru Kishi, Hiratsuka (JP); Norikazu Matsuzaki, Atsugi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 209 days.

(21) Appl. No.: 15/559,960

(22) PCT Filed: Mar. 18, 2016

(86) PCT No.: PCT/JP2016/058738
§ 371 (c)(1),
(2) Date: Sep. 20, 2017

(87) PCT Pub. No.: WO2016/158505
PCT Pub. Date: Oct. 6, 2016

(65) Prior Publication Data
US 2018/0105156 A1 Apr. 19, 2018

(30) Foreign Application Priority Data
Mar. 31, 2015 (JP) .................................. 2015-073576

(51) Int. Cl.
*B60T 13/66* (2006.01)
*B60T 8/00* (2006.01)
(Continued)

(52) U.S. Cl.
CPC ............ *B60T 13/662* (2013.01); *B60T 7/042* (2013.01); *B60T 8/00* (2013.01); *B60T 8/4077* (2013.01);
(Continued)

(58) Field of Classification Search
CPC .... B60T 13/745; B60T 13/662; B60T 13/686; B60T 7/042; B60T 2270/82; B60T 2220/04
See application file for complete search history.

(56) References Cited

U.S. PATENT DOCUMENTS

| 2011/0241418 A1* | 10/2011 | Nozawa | B60T 1/10 |
| | | | 303/3 |
| 2014/0257658 A1* | 9/2014 | Shimizu | B60T 8/17 |
| | | | 701/70 |
| 2016/0121729 A1* | 5/2016 | Seol | B60L 7/26 |
| | | | 701/78 |

FOREIGN PATENT DOCUMENTS

| JP | 2011-213262 | 10/2011 |
| JP | 2014-111394 | 6/2014 |
| JP | 2014-169039 | 9/2014 |

OTHER PUBLICATIONS

International Search Report dated May 24, 2016 in International Application No. PCT/JP2016/058738.

* cited by examiner

*Primary Examiner* — Vishal R Sahni
(74) *Attorney, Agent, or Firm* — Wenderoth, Lind & Ponack, L.L.P.

(57) ABSTRACT

Even when downstream stiffness in a brake hydraulic circuit changes due to variation in a caliper forming a part of a wheel cylinder, temperature, wear degree, and deterioration of a frictional pad, and/or the like, a brake control apparatus performs calculation processing for calculating a switching reference operation amount, switching operation amount deviation calculation processing for calculating a deviation from the switching reference operation amount, operation amount offset processing for offsetting a pedal operation amount detected by an operation amount detection unit, target hydraulic pressure calculation processing for calcu- (Continued)

lating the target hydraulic pressure with use of the offset operation amount and a reference hydraulic characteristic, and control of the electric motor (21) according to the target hydraulic pressure. By this configuration, the brake control apparatus limits an excessive movement amount of a primary piston by changing the reference hydraulic characteristic according to the change in the downstream stiffness.

18 Claims, 13 Drawing Sheets

(51) Int. Cl.
*B60T 7/04* (2006.01)
*B60T 13/68* (2006.01)
*B60T 13/74* (2006.01)
*B60T 8/40* (2006.01)
*B60T 8/96* (2006.01)

(52) U.S. Cl.
CPC .............. *B60T 8/96* (2013.01); *B60T 13/686* (2013.01); *B60T 13/745* (2013.01); *B60T 2220/04* (2013.01); *B60T 2270/82* (2013.01)

BRAKE CONTROL APPARATUS

TECHNICAL FIELD

The present invention relates to a brake control apparatus preferably usable for a vehicle, such as a four-wheeled automobile.

BACKGROUND ART

Some of brake control apparatuses mounted on vehicles, such as four-wheeled automobiles, are configured to variably control a brake hydraulic pressure to be generated in a master cylinder to supply brake fluid to a wheel cylinder of the vehicle with use of an electric motor or the like. This kind of brake apparatus is configured to calculate an amount by which a driver operates a brake pedal, and switch control between positional control and hydraulic control as necessary. In the positional control, the brake control apparatus controls a rotation of the electric motor in such a manner that a relative displacement between an input member coupled to the brake pedal and a primary piston of the master cylinder matches a preset target relative displacement. In the hydraulic control, the brake control apparatus controls the rotation of the electric motor in such a manner that a hydraulic pressure in the master cylinder matches a preset target hydraulic pressure with respect to the amount by which the brake pedal is operated (for example, refer to PTL 1).

CITATION LIST

Patent Literature

PTL 1: Japanese Patent Application Public Disclosure No. 2011-213262

SUMMARY OF INVENTION

Technical Problem

On the other hand, in the brake control apparatus according to the conventional technique, a brake fluid amount required for a hydraulic pressure in a brake hydraulic circuit (hereinafter referred to as a downstream stiffness) may change due to a variation in a caliper forming a part of the wheel cylinder, a temperature, a wear degree, and deterioration of a frictional pad, and/or the like. Then, the occurrence of the change in such a downstream stiffness undesirably leads to generation of a difference between an actual hydraulic pressure in the master cylinder that is actually generated during the positional control and the target hydraulic pressure, thereby raising a possibility of bringing about such a phenomenon that, even when the brake pedal is operated by the same amount, a vehicle deceleration undesirably changes among a plurality of operations. In other words, the vehicle deceleration may undesirably change according to a state of the downstream stiffness when the control of the electric motor is switched from the positional control to the hydraulic control.

The present invention has been made in consideration of the above-described drawback of the conventional technique, and an object of the present invention is to provide a brake control apparatus capable of preventing or reducing the change in the vehicle deceleration regardless of the state of the downstream stiffness when the control of the electric motor is switched from the positional control to the hydraulic control.

Solution to Problem

To achieve the above-described object, a brake control apparatus according to one aspect of the present invention includes an electric motor configured to be usable to move a piston of a master cylinder, an operation amount detection unit configured to detect an operation amount of a brake pedal, a hydraulic detection unit configured to detect a hydraulic value generated in the master cylinder, a piston position detection unit configured to detect a piston position in the master cylinder, and a control unit configured to control the electric motor based on the operation amount detected by the operation amount detection unit. In the control unit, a reference position characteristic and a reference hydraulic characteristic are set. The reference position characteristic indicates a preset relationship between the operation amount and the piston position. The reference hydraulic characteristic indicates a relationship between the operation amount and the hydraulic value. The control unit includes a control switching unit configured to switch control between positional control of controlling the electric motor based on the reference position characteristic with respect to the operation amount detected by the operation amount detection unit, and hydraulic control of controlling the electric motor based on the reference hydraulic characteristic with respect to the operation amount detected by the operation amount detection unit. When switching the control from the positional control to the hydraulic control by this control switching unit, the control unit calculates a target hydraulic pressure for the hydraulic pressure to be generated by the master cylinder according to a difference between the operation amount detected by the operation amount detection unit when the hydraulic detection unit detects a preset predetermined hydraulic pressure at which the hydraulic pressure generated by the master cylinder can be detected, and a reference operation amount at the time of the predetermined hydraulic pressure in the reference hydraulic characteristic. The control unit controls the electric motor in such a manner that the hydraulic value detected by the hydraulic detection unit matches the target hydraulic pressure during the hydraulic control.

Further, a brake control apparatus according to another aspect of the present invention includes an electric motor configured to be usable to move a piston of a master cylinder, a hydraulic detection unit configured to detect a hydraulic value generated in the master cylinder, an operation amount detection unit configured to detect an operation amount of a brake pedal, a piston position detection unit configured to detect a piston position in the master cylinder, and a control unit configured to control the electric motor based on the operation amount detected by the operation amount detection unit. In the control unit, a reference position characteristic and a reference hydraulic characteristic are set. The reference position characteristic indicates a preset relationship between the operation amount and the piston position. The reference hydraulic characteristic indicates a relationship between the operation amount and the hydraulic value. The control unit includes a control switching unit configured to switch control between positional control of controlling the electric motor based on the reference position characteristic with respect to the operation amount detected by the operation amount detection unit, and hydraulic control of controlling the electric motor based on the reference hydraulic characteristic with respect to the operation amount detected by the operation amount detection unit. When switching the control from the positional control to the hydraulic control by this control switching unit, the control unit calculates a target hydraulic pressure for the hydraulic pressure to be generated by the master cylinder according to a difference between the hydraulic value detected by the hydraulic detection unit when the operation amount detection unit detects a preset predetermined operation amount at which the hydraulic detection unit detects that the hydraulic pressure can be generated by the master cylinder, and a reference hydraulic pressure at the time of the predetermined operation amount in the reference hydraulic characteristic. The control unit controls activation of the electric motor in such a manner that the hydraulic value detected by the hydraulic detection unit matches the target hydraulic pressure during the hydraulic control.

Advantageous Effects of Invention

According to the present invention, the change in the vehicle deceleration can be prevented or reduced regardless of the state of the downstream stiffness when the control of the electric motor is switched from the positional control to the hydraulic control.

DESCRIPTION OF EMBODIMENTS

In the following description, brake control apparatuses according to embodiments of the present invention will be described in detail with reference to the accompanying drawings, citing a brake control apparatus mounted on a four-wheeled automobile as an example.

Figure 1:
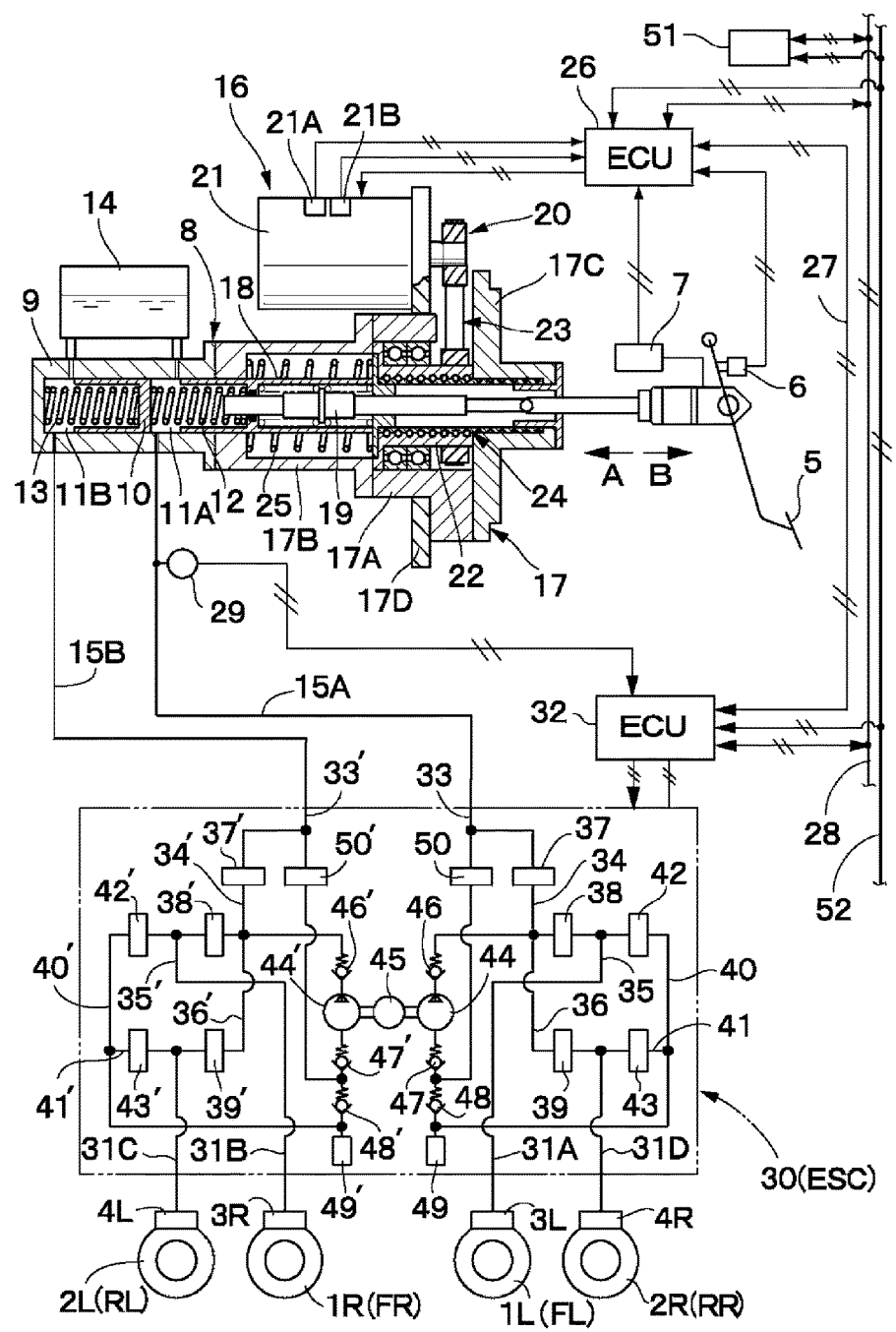
FIG. 1 illustrates an entire configuration of a brake system including a brake control apparatus according to each of embodiments of the present invention.

Referring now to the drawings, FIGS. 1 to 7 conceptually illustrate a brake system including a brake control apparatus according to a first embodiment of the present invention. In FIG. 1, front left and right wheels 1L and 1R, and rear left and right wheels 2L and 2R are mounted under a vehicle body (not illustrated), which forms a main structure of a vehicle. Front wheel-side wheel cylinders 3L and 3R are mounted on the front left and right wheels 1L and 1R, respectively, and rear wheel-side wheel cylinders 4L and 4R are mounted on the rear left and right wheels 2L and 2R, respectively. These wheel cylinders 3L, 3R, 4L and 4R form cylinders of hydraulic disk brakes or drum brakes, and function to apply braking forces to the respective wheels (the front wheels 1L and 1R, and the rear wheels 2L and 2R) for each wheel.

A brake pedal 5 is mounted on a front-board (not illustrated) side of the vehicle body. This brake pedal 5 is operated by being pressed by a driver in a direction indicated by an arrow A in FIG. 1 at the time of an operation of braking the vehicle. A brake switch 6 and an operation amount detector 7 are mounted on the brake pedal 5. The brake switch 6 functions to detect whether there is the operation of braking the vehicle to, for example, turn on and off a brake lamp (not illustrated). Further, the operation amount detector 7 detects an operation amount (a stroke amount) or a force by which the brake pedal 5 is pressed, and outputs a detection signal thereof to, for example, ECUs 26 and 32 and a vehicle data bus 28, which will be described below. When the brake pedal 5 is operated by being pressed, a brake hydraulic pressure is generated in the master cylinder 8 via an electric boosting apparatus 16, which will be described below.

Figure 2:
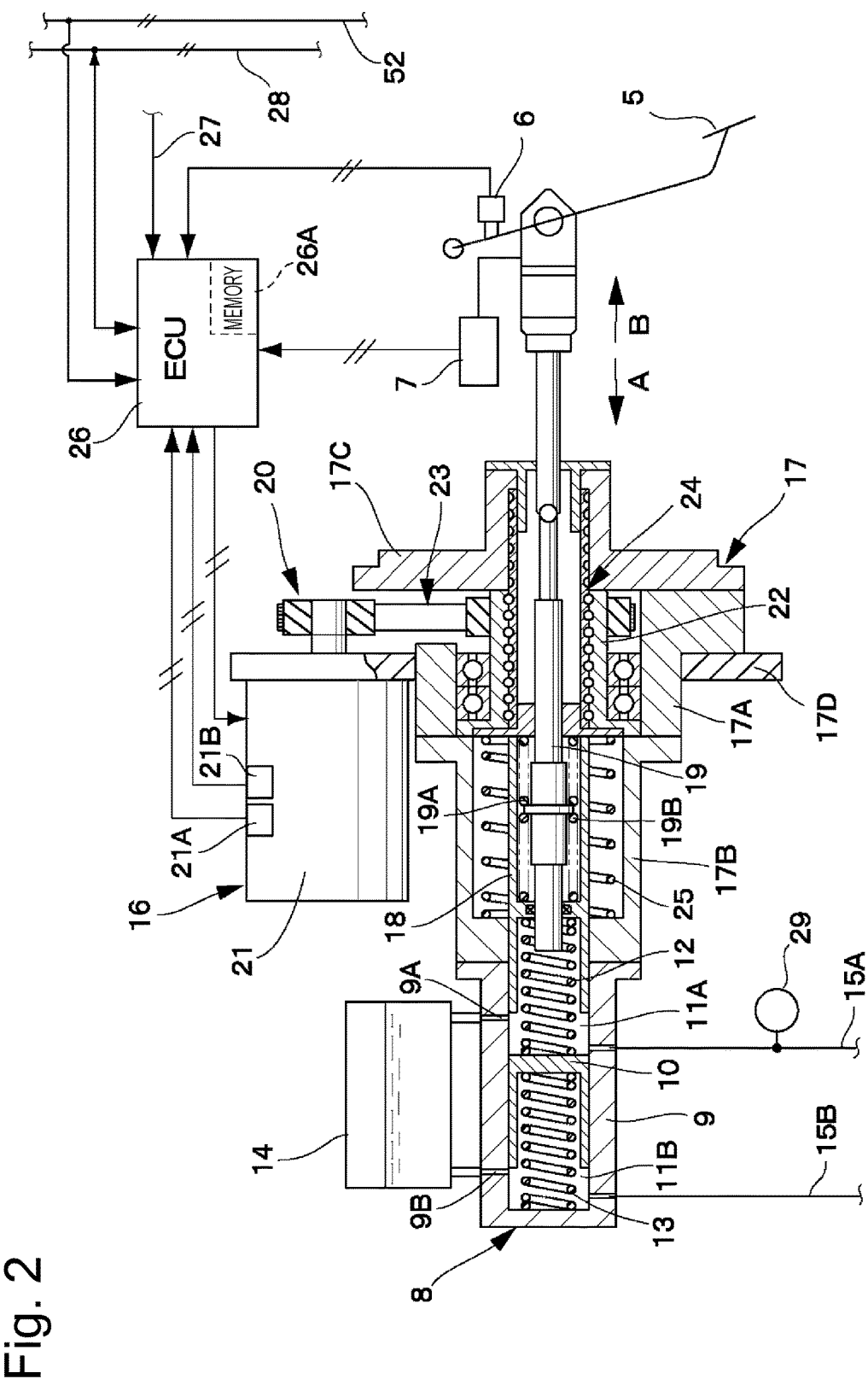
FIG. 2 is a cross-sectional view illustrating an electric boosting apparatus and the like illustrated in FIG. 1 in an enlarged manner.

As illustrated in FIG. 2, the master cylinder 8 includes a bottomed cylindrical cylinder main body 9 having one side configured as an opening end and an opposite side configured as a bottom portion and closed. First and second supply ports 9A and 9B in communication with an inside of a reservoir 14, which will be described below, are provided on this cylinder main body 9. The first supply port 9A is brought into communication with and disconnected from a first hydraulic chamber 11A by a sliding displacement of a booster piston 18, which will be described below. On the other hand, the second supply port 9B is brought into communication with and disconnected from a second hydraulic chamber 11B by a second piston 10, which will be described below.

The cylinder main body 9 is detachably fixed at the opening end side thereof to a booster housing 17 of the electric boosting apparatus 16, which will be described below, with use of a plurality of attachment bolts (not illustrated) or the like. The master cylinder 8 includes the cylinder main body 9, a first piston (the booster piston 18 and an input rod 19, which will be described below) and the second piston 10, the first hydraulic chamber 11A, the second hydraulic chamber 11B, a first return spring 12, and a second return spring 13.

In this case, in the master cylinder 8, the first piston as a primary piston (i.e., a P piston) is formed by the booster piston 18 and the input rod 19, which will be described below. The first hydraulic chamber 11A formed in the cylinder main body 9 is defined between the second piston 10 as a secondary piston and the booster piston 18 (and the input rod 19). The second hydraulic chamber 11B is defined in the cylinder main body 9 between the bottom portion of the cylinder main body 9 and the second piston 10.

The first return spring 12 is located in the first hydraulic chamber 11A and disposed between the booster piston 18 and the second piston 10, and biases the booster piston 18 toward the opening end side of the cylinder main body 9. The second return spring 13 is located in the second hydraulic chamber 11B and disposed between the bottom portion of the cylinder main body 9 and the second piston 10, and biases the second piston 10 toward the first hydraulic chamber 11A side.

The booster piston 18 (the input rod 19) and the second piston 10 are displaced toward the bottom portion of the cylinder main body 9 according to the operation of pressing the brake pedal 5 in the cylinder main body 9 of the master cylinder 8. Then, when the first and second supply ports 9A and 9B are disconnected by the booster piston 18 and the second piston 10, respectively, the brake hydraulic pressure is generated from the master cylinder 8 by the brake fluid in the first and second hydraulic chambers 11A and 11B. On the other hand, when the operation on the brake pedal 5 is released, the booster piston 18 (and the input rod 19) and the second piston 10 are being displaced by the first and second return springs 12 and 13, respectively, toward the opening portion of the cylinder main body 9 in a direction indicated by an arrow B. At this time, the master cylinder 8 is releasing the hydraulic pressure in the first and second hydraulic chambers 11A and 11B while receiving replenishment of the brake fluid from the reservoir 14.

The reservoir 14 as a working fluid tank containing the brake fluid therein is provided on the cylinder main body 9 of the master cylinder 8. This reservoir 14 supplies and discharges the brake fluid into and from the hydraulic chambers 11A and 11B in the cylinder main body 9. In other words, while the first supply port 9A is in communication with the first hydraulic chamber 11A by the booster piston 18 and the second supply port 9B is in communication with the second hydraulic chamber 11B by the second piston 10, the brake fluid in the reservoir 14 is supplied and discharged into and from these hydraulic chambers 11A and 11B.

On the other hand, when the first supply port 9A is disconnected from the first hydraulic chamber 11A by the booster piston 18 and the second supply port 9B is disconnected from the second hydraulic chamber 11B by the second piston 10, the supply and the discharge of the brake fluid from and into the reservoir 14 into and from these hydraulic chambers 11A and 11B are stopped. Therefore, the brake hydraulic pressure is generated in the first and second hydraulic chambers 11A and 11B of the master cylinder 8 according to the brake operation, and this hydraulic pressure is transmitted to a hydraulic supply apparatus 30 (i.e., an ESC 30), which will be described below, via, for example, a pair of cylinder-side hydraulic pipes 15A and 15B.

The electric boosting apparatus 16 as a booster for increasing the force operating the brake pedal 5 and a brake apparatus is provided between the brake pedal 5 of the vehicle and the master cylinder 8. This electric boosting apparatus 16 functions to variably control the brake hydraulic pressure generated in the master cylinder 8 by controlling driving of an electric actuator 20, which will be described below, based on the output of the operation amount detector 7.

The electric boosting apparatus 16 includes the booster housing 17, the booster piston 18, and the electric actuator 20, which will be described below. The booster housing 17 is provided fixedly to a front wall (not illustrated) of a vehicle compartment, which corresponds to the front-board of the vehicle body. The booster piston 18 serves as a piston movably provided in this booster housing 17 and displaceably relative to the input rod 19, which will be described below. The electric actuator 20 causes forward and backward movements of this booster piston 18 in an axial direction of the master cylinder 8 and applies a booster thrust force to this booster piston 18.

The booster piston 18 is formed by a cylindrical member axially slidably and fittedly inserted in the cylinder main body 9 of the master cylinder 8 from the opening end side thereof. The input rod 19 is slidably and fittedly inserted on an inner peripheral side of the booster piston 18. The input rod 19 serves as an input member pushed directly according to the operation on the brake pedal 5 and moved forward and backward in the axial direction of the master cylinder 8 (i.e., the directions indicated by the arrows A and B). The input rod 19 forms the first piston of the master cylinder 8 together with the booster piston 18, and the brake pedal 5 is coupled to a rear-side (one axial side) end of the input rod 19. The first hydraulic chamber 11A is defined in the cylinder main body 9 between the second piston 10 and the booster piston 18 (the input rod 19).

The booster housing 17 includes a cylindrical speed reducer casing 17A, a cylindrical support casing 17B, and a stepped cylindrical cover member 17C. The speed reducer casing 17A contains therein, for example, a speed reduction mechanism 23, which will be described below. The support casing 17B is provided between this speed reducer casing 17A and the cylinder main body 9 of the master cylinder 8, and supports the booster piston 18 axially slidably displaceably. The cover member 17C is disposed on an axially opposite side (the one axial side) of the speed reducer casing 17A from the support case 17B, and closes an opening on the one axial side of the speed reducer casing 17A. A support plate 17D for fixedly supporting an electric motor 21, which will be described below, is provided on an outer peripheral side of the speed reducer casing 17A.

As illustrated in FIG. 2, the input rod 19 is inserted in the booster housing 17 from the cover member 17C side, and axially extends toward the first hydraulic chamber 11A in the booster piston 18. A pair of neutral springs 19A and 19B is interposed between the booster piston 18 and the input rod 19. The brake system is configured in such a manner that the booster piston 18 and the input rod 19 are elastically held at a neutral position by spring forces of the neutral springs 19A and 19B, and the spring forces of the neutral springs 19A and 19B are applied against an axial relative displacement between them.

An end surface of the input rod 19 on a distal end side (an opposite axial side) receives the hydraulic pressure generated in the first hydraulic chamber 11A as a brake reaction force at the time of the brake operation, and the input rod 19 transmits it to the brake pedal 5. By this transmission, the driver of the vehicle can receive an appropriate response to the pressing via the brake pedal 5, thereby acquiring an excellent pedal feeling (a feedback indicating that the brake is working). As a result, an operational feeling of the brake pedal 5 can be improved, and the pedal feeling (the response to the pressing) can be kept excellent.

Further, the input rod 19 is configured to be able to cause the booster piston 18 to advance by abutting against the booster piston 18 when advancing by a predetermined amount relative to the booster piston 18. This configuration allows the booster piston 18 to advance by the pressing force applied to the brake pedal 5 to generate the hydraulic pressure in the master cylinder 8 when a failure has occurred in the electric actuator 20 or the first ECU 26, which will be described below.

The electric actuator 20 of the electric boosting apparatus 16 includes the electric motor 21, the speed reduction mechanism 23, and a linear motion mechanism 24. The electric motor 21 is provided on the speed reducer casing 17A of the booster housing 17 via the support plate 17D. The speed reduction mechanism 23 is, for example, a belt that slows down a rotation of this electric motor 21 to transmit the rotation to a cylindrical rotational member 22 in the speed reducer casing 17A. The linear motion mechanism 24 is, for example, a ball screw that converts a rotation of the cylindrical rotational member 22 into an axial displacement (the forward or backward movement) of the booster piston 18. The booster piston 18 and the input rod 19 face the first hydraulic chamber 11A of the master cylinder 8 at their respective front ends (ends on the opposite axial side), and cause the brake hydraulic pressure to be generated in the master cylinder 8 by the pressing force (a thrust force) transmitted from the brake pedal 5 to the input rod 19 and the booster thrust force transmitted from the electric actuator 20 to the booster piston 18.

In other words, the booster piston 18 of the electric boosting apparatus 16 forms a pump mechanism that is driven by the electric actuator 20 based on the output of the operation amount detector 7 (i.e., a braking instruction) to cause the brake hydraulic pressure (a master cylinder pressure) to be generated in the master cylinder 8. Further, a return spring 25 is provided in the support casing 17B of the booster housing 17. The return spring 25 constantly biases the booster piston 18 in a braking release direction (the direction indicated by the arrow B in FIG. 1). The booster piston 18 is returned as far as an initial position illustrated in FIGS. 1 and 2 in the direction indicated by the arrow B by a driving force when the electric motor 21 is rotated in a reverse direction and the biasing force of the return spring 25 when the brake operation is released.

The electric motor 21 is constructed with use of, for example, a DC brushless motor, and includes a rotational sensor 21A called a resolver and a current sensor 21B that detects a motor current. The rotational sensor 21A detects a rotational position of the electric motor 21 (a motor shaft) and outputs a detection signal thereof to a control unit that is a first control circuit (hereinafter referred to as the first ECU 26). The first ECU 26 performs feedback control of the electric motor 21 (i.e., the booster piston 18) according to this rotational signal. Further, the rotational sensor 21A has a function as a piston position detection unit that detects an absolute displacement of the booster piston 18 with respect to the vehicle body based on the detected rotational position of the electric motor 21.

Then, the rotational sensor 21A forms a displacement detection unit that detects the relative displacement between the booster piston 18 and the input rod 19 together with the operation amount detector 7, and these detection signals are transmitted to the first ECU 26. The above-described piston position detection unit (a rotation detection unit) may be embodied with use of not only the rotational sensor 21A such as the resolver but also, for example, a rotary potentiometer capable of detecting an absolute displacement (an angle). The speed reduction mechanism 23 may be embodied with use of not only the belt and the like but also, for example, a gear reduction mechanism. Further, the linear motion mechanism 24, which converts the rotational motion into the linear motion, can also be embodied with use of, for example, a rack and pinion mechanism. Further, the speed reduction mechanism 23 does not necessarily have to be provided. For example, the electric motor 21 may be configured in such a manner that the motor shaft is integrally provided to the cylindrical rotational member 22 and a stator of the electric motor is disposed around the cylindrical rotational member 22, whereby the cylindrical rotational member 22 is rotated directly by the electric motor as a rotor.

The first ECU 26 includes, for example, a microcomputer, and forms a part of the electric boosting apparatus 16 and also forms a control unit of the brake control apparatus. The first ECU 26 forms a master pressure control unit (i.e., the first control circuit) that electrically controls the driving of the electric actuator 20 of the electric boosting apparatus 16. An input side of the first ECU 26 is connected to the operation amount detector 7 that detects the operation amount or the pressing force of the brake pedal 5, the rotational sensor 21A and the current sensor 21B of the electric motor 21, an in-vehicle signal line 27 capable of carrying out, for example, communication called L-CAN, the vehicle data bus 28 that provides and receives a signal to and from an ECU of another vehicle apparatus, and the like.

The vehicle data bus 28 is a serial communication portion called V-CAN that is mounted on the vehicle, and functions to carry out in-vehicle multiplex communication. Further, power is supplied from an in-vehicle battery (not illustrated) to the first ECU 26 via a power source line 52, which will be described below. In FIGS. 1 and 2, a line with two slash marks added thereto indicates an electricity-related line such as a signal line and a power source line.

A hydraulic sensor 29 forms a hydraulic detection unit that detects the brake hydraulic pressure in the master cylinder 8. This hydraulic sensor 29 functions to detect, for example, a hydraulic pressure in the cylinder-side hydraulic pipe 15A, and detects the brake hydraulic pressure supplied from the master cylinder 8 to the ESC 30, which will be described below, via the cylinder-side hydraulic pipe 15A. In the present embodiment, the hydraulic sensor 29 is electrically connected to the second ECU 32, which will be described below, and a detection signal output from the hydraulic sensor 29 is also transmitted from the second ECU 32 to the first ECU 26 via the communication using the signal line 27.

The brake system may also be configured in such a manner that the hydraulic sensor 29 is provided to each of both the cylinder-side hydraulic pipes 15A and 15B. Further, the hydraulic sensor 29 may be directly attached to the cylinder main body 9 of the master cylinder 8 as long as the hydraulic sensor 29 can detect the brake hydraulic pressure in the master cylinder 8. Further, the hydraulic sensor 29 may be configured to be able to directly input the detection signal thereof to the first ECU 26 without the intervention of the second ECU 32.

An output side of the first ECU 26 is connected to the electric motor 21, the in-vehicle signal line 27, the vehicle data bus 28, and the like. Then, the first ECU 26 variably controls the brake hydraulic pressure to be generated in the master cylinder 8 by the electric actuator 20 according to the detection signals from the operation amount detector 7 and the hydraulic sensor 29, and also has a function of determining, for example, whether the electric boosting apparatus 16 normally operates.

In the electric boosting apparatus 16, the input rod 19 advances toward inside the cylinder main body 9 of the master cylinder 8 when the brake pedal 5 is operated by being pressed, and the motion at this time is detected by the operation amount detector 7. The first ECU 26 outputs an activation instruction to the electric motor 21 according to the detection signal from the operation amount detector 7 to rotationally drive the electric motor 21, and this rotation is transmitted to the cylindrical rotational member 22 via the speed reduction mechanism 23 and the rotation of the cylindrical rotational member 22 is also converted into the axial displacement of the booster piston 18 by the linear motion mechanism 24.

At this time, the booster piston 18 advances integrally with the input rod 19 (or displaceably relative to the input rod 19, as will be described below) toward inside the cylinder main body 9 of the master cylinder 8, and the brake hydraulic pressure is generated in the first and second hydraulic chambers 11A and 11B of the master cylinder 8 by an amount according to the pressing force (the thrust force) applied form the brake pedal 5 to the input rod 19 and the booster thrust force applied from the electric actuator 20 to the booster piston 18. Further, the first ECU 26 can monitor the hydraulic pressure generated in the master cylinder 8 by receiving the detection signal output from the hydraulic sensor 29 via the signal line 27, and determine whether the electric boosting apparatus 16 normally operates.

Next, the hydraulic supply apparatus 30 (i.e., the ESC 30) as a second braking mechanism will be described with reference to FIG. 1.

The hydraulic supply apparatus 30 as the ESC is provided between the wheel cylinders 3L, 3R, 4L and 4R disposed on the respective wheel (the front wheels 1L and 1R and the rear wheels 2L and 2R) sides of the vehicle, and the master cylinder 8. The hydraulic supply apparatus 30 forms a wheel cylinder pressure control apparatus that variably controls the brake hydraulic pressure generated in the master cylinder 8 (the first and second hydraulic chambers 11A and 11B) by the electric boosting apparatus 16 as a wheel cylinder pressure for each of the wheels, and individually supplies the wheel cylinder pressure to each of the wheel cylinders 3L, 3R, 4L, and 4R on the respective wheels.

In other words, the hydraulic supply apparatus 30 functions to supply a required brake hydraulic pressure from the master cylinder 8 to each of the wheel cylinders 3L, 3R, 4L, and 4R via the cylinder-side hydraulic pipes 15A and 15B and the like when each of various kinds of brake control (for example, braking force distribution control of distributing the braking force for each of the front wheels 1L and 1R and the rear wheels 2L and 2R, anti-lock brake control, vehicle stabilization control, and the like) is performed.

Then, the hydraulic supply apparatus 30 distributes and supplies the hydraulic pressure output from the master cylinder 8 (the first and second hydraulic chambers 11A and 11B) via the cylinder-side hydraulic pipes 15A and 15B to the wheel cylinders 3L, 3R, 4L, and 4R via brake-side pipe portions 31A, 31B, 31C, and 31D, respectively. As a result, the braking force independent of one another is individually applied to each of the wheels (the front wheels 1L and 1R and the rear wheels 2L and 2R) as described above. The hydraulic supply apparatus 30 includes each of control vales 37, 37', 38, 38', 39, 39', 42, 42', 43, 43', 50, and 50', which will be described below, an electric motor 45 that drives hydraulic pumps 44 and 44', hydraulic control reservoirs 49 and 49', and the like.

The second ECU 32 is a hydraulic supply apparatus controller as a wheel pressure control unit (i.e., a second control circuit) that electrically controls driving of the hydraulic supply apparatus 30. An input side of this second ECU 32 is connected to the hydraulic sensor 29, the signal line 27, the vehicle data bus 28, and the like. An output side of the second ECU 32 is connected to each of the control vales 37, 37', 38, 38', 39, 39', 42, 42', 43, 43', 50, and 50', which will be described below, the electric motor 45, the signal line 27, the vehicle data bus 28, and the like.

Then, the second ECU 32 individually controls the driving of each of the control vales 37, 37', 38, 38', 39, 39', 42, 42', 43, 43', 50, and 50', the electric motor 45, and the like of the hydraulic supply apparatus 30, as will be described below. By this control, the second ECU 32 functions to individually perform control of reducing, maintaining, and increasing or pressurizing the brake hydraulic pressure to be supplied from the brake-side pipe portions 31A to 31D to the wheel cylinders 3L, 3R, 4L, and 4R, respectively, for each of the wheel cylinders 3L, 3R, 4L, and 4R.

In other words, the second ECU 32 can perform, for example, the following kinds of control (1) to (8) by controlling the activation of the hydraulic supply apparatus 30 (ESC).

The kinds of control performed by the second ECU 32 are: (1) the braking force distribution control of appropriately distributing the braking force to each of the wheels (1L, 1R, 2L, and 2R) according to a vertical load and the like when the vehicle is braked, (2) the anti-lock brake control of preventing the front wheels 1L and 1R and the rear wheels 2L and 2R from being locked by automatically adjusting the braking force applied to each of the wheels (1L, 1R, 2L, and 2R) when the vehicle is braked, (3) the vehicle stabilization control of stabilizing a behavior of the vehicle by preventing or reducing understeer and oversteer while detecting a sideslip of each of the wheels (1L, 1R, 2L, and 2R) when the vehicle is running to appropriately automatically control the braking force to be applied to each of the wheels (1L, 1R, 2L, and 2R) regardless of the operation amount of the brake pedal 5, (4) hill start aid control of aiding a start by holding a braked state on a slope (especially, an upslope), (5) traction control of preventing each of the wheels (1L, 1R, 2L, and 2R) from idly spinning, for example, when the vehicle starts running, (6) adaptive cruise control of maintaining a predetermined distance to a vehicle running ahead, (7) traffic lane departure avoidance control of maintaining the vehicle within a traffic lane, and (8) obstacle avoidance control of avoiding a collision with an obstacle in front of or behind the vehicle.

The hydraulic supply apparatus 30 includes two hydraulic circuit systems, a first hydraulic system 33 and a second hydraulic system 33'. The first hydraulic system 33 is connected to one of the output ports (i.e., the cylinder-side hydraulic pipe 15A) of the master cylinder 8 and supplies the hydraulic pressure to the wheel cylinder 3L on the front left wheel (FL) side and the wheel cylinder 4R on the rear right wheel (RR) side. The second hydraulic system 33' is connected to the other of the output ports (i.e., the cylinder-side hydraulic pipe 15B), and supplies the hydraulic pressure to the wheel cylinder 3R on the front right wheel (FR) side and the wheel cylinder 4L on the rear left wheel (RL) side. Then, the first hydraulic system 33 and the second hydraulic system 33' are configured similarly to each other. Therefore, in the following description, only the first hydraulic system 33 will be described, and each of components of the second hydraulic system 33' will not be described redundantly by being indicated by a mark "'" added to reference numerals thereof.

The first hydraulic system 33 of the hydraulic supply apparatus 30 includes a brake pipe conduit 34 connected to a distal end side of the cylinder-side hydraulic pipe 15A. The brake pipe conduit 34 branches into two first and second pipe conduit portions 35 and 36, and is connected to each of the wheel cylinders 3L and 4R. The brake pipe conduit 34 and the first pipe conduit portion 35 form a pipe conduit that supplies the hydraulic pressure to the wheel cylinder 3L together with the brake-side pipe portion 31A, and the brake pipe conduit 34 and the second pipe conduit portion 36 form a pipe conduit that supplies the hydraulic pressure to the wheel cylinder 4R together with the brake-side pipe portion 31D.

The supply control valve 37 for the brake hydraulic pressure is provided in the brake pipe conduit 34, and this supply control valve 37 is constructed with use of a normally-opened electromagnetic switching valve that opens and closes the brake pipe conduit 34. The pressure increase control valve 38 is provided in the first pipe conduit portion 35, and this pressure increase control valve 38 is constructed with use of a normally-opened electromagnetic switching valve that opens and closes the first pipe conduit portion 35. The pressure increase control valve 39 is provided in the second pipe conduit portion 36, and this pressure increase control valve 39 is constructed with use of a normally-opened electromagnetic valve that opens and closes the second pipe conduit portion 36.

On the other hand, the first hydraulic system 33 of the hydraulic supply apparatus 30 includes first and second pressure reduction pipe conduits 40 and 41 that connect the wheel cylinder 3L and 4R side and the hydraulic control reservoir 49 to each other. The first and second pressure reduction control valves 42 and 43 are provided in these pressure reduction pipe conduits 40 and 41, respectively. The first and second pressure reduction control valves 42 and 43 are constructed with use of normally-closed electromagnetic switching valves that open and close the pressure reduction pipe conduits 40 and 41, respectively.

Further, the hydraulic supply apparatus 30 includes the hydraulic pump 44 as a hydraulic generation unit serving as a hydraulic source, and this hydraulic pump 44 is rotationally driven by the electric motor 45. Then, the electric motor 45 is driven by power supply from the second ECU 32, and the rotation thereof is stopped together with the hydraulic pump 44 when the power supply is stopped. A discharge side of the hydraulic pump 44 is connected to a position on a downstream side of the supply control valve 37 in the brake pipe conduit 34 (i.e., a position where the brake pipe conduit 34 branches into the first pipe conduit portion 35 and the second pipe conduit portion 36) via a check valve 46. An intake side of the hydraulic pump 44 is connected to the hydraulic control reservoir 49 via the check valves 47 and 48.

The hydraulic control reservoir 49 is provided to temporarily store excessive brake fluid, and functions to temporarily store the excessive brake fluid flowing out from a cylinder camber (not illustrated) of each of the wheel cylinders 3L and 4R at the time of not only the ABS control of the brake system (the hydraulic supply apparatus 30) but also brake control other than that. Further, the intake side of the hydraulic pump 44 is connected to the cylinder-side hydraulic pipe 15A of the master cylinder 8 (i.e., a position on an upstream side of the supply control valve 37 in the brake pipe conduit 34) via the check valve 47 and the pressurization control valve 50, which is a normally-closed electromagnetic switching valve.

The second ECU 32 outputs a control signal for operation control according to a respectively predetermined procedure to each of the control valves 37, 37', 38, 38', 39, 39', 42, 42', 43, 43', 50, and 50' forming the hydraulic supply apparatus 30, and to the electric motor 45 which drives the hydraulic pumps 44 and 44'.

More specifically, the first hydraulic system 33 of the hydraulic supply apparatus 30 directly supplies the hydraulic pressure generated in the master cylinder 8 by the electric boosting apparatus 16 to the wheel cylinders 3L and 4R via the brake pipe conduit 34 and the first and second pipe conduit portions 35 and 36 at the time of a normal operation according to the brake operation performed by the driver. For example, when anti-skid control or the like is supposed to be performed, the first hydraulic system 33 maintains the hydraulic pressures in the wheel cylinders 3L and 4R by closing the pressure increase control valves 38 and 39, respectively. When the hydraulic pressures in the wheel cylinders 3L and 4R are supposed to be reduced, the first hydraulic system 33 discharges the hydraulic pressures in the wheel cylinders 3L and 4R to the hydraulic control reservoir 49 as if releasing them by opening the pressure reduction control valves 42 and 43, respectively.

Further, when the hydraulic pressures to be supplied to the wheel cylinders 3L and 4R are supposed to be increased to perform the stabilization control (electronic stability control) when the vehicle is running, the first hydraulic system 33 activates the hydraulic pump 44 by the electric motor 45 with the supply control valve 37 opened, thereby supplying the brake fluid discharged from this hydraulic pump 44 to the wheel cylinders 3L and 4R via the first and second pipe conduit portions 35 and 36, respectively. At this time, since the pressurization control valve 50 is opened, the brake fluid in the reservoir 14 is supplied from the master cylinder 8 side toward the intake side of the hydraulic pump 44.

In this manner, the second ECU 32 controls the activation of the supply control valve 37, the pressure increase control valves 38 and 39, the pressure reduction control valves 42 and 43, the pressurization control valve 50, and the electric motor 45 (i.e., the hydraulic pump 44) to maintain, reduce, or increase the hydraulic pressures to be supplied to the wheel cylinders 3L and 4R as appropriate based on vehicle driving information and the like. This operation realizes the execution of the brake control such as the above-described braking force distribution control, vehicle stabilization control, brake assist control, anti-skid control, traction control, and hill start aid control.

On the other hand, in the normal braking mode performed with the electric motor 45 (i.e., the hydraulic pump 44) stopped, the first hydraulic system 33 opens the supply control valve 37 and the pressure increase control valves 38 and 39, and closes the pressure reduction control valves 42 and 43 and the pressurization control valve 50. In this state, when the first piston (i.e., the booster piston 18 and the input rod 19) of the master cylinder 8 and the second piston 10 are displaced axially in the cylinder main body 9 according to the operation of pressing the brake pedal 5, the brake hydraulic pressure generated in the first hydraulic chamber 11A is supplied from the cylinder-side hydraulic pipe 15A side to the wheel cylinders 3L and 4R via the first hydraulic system 33 of the hydraulic supply apparatus 30 and the brake-side pipe portions 31A and 31D. The brake hydraulic pressure generated in the second hydraulic chamber 11B is supplied from the cylinder-side hydraulic pipe 15B side to the wheel cylinders 3R and 4L via the second hydraulic system 33' and the brake-side pipe portions 31B and 31C.

Further, when the booster piston 18 cannot be activated by the electric motor 21 due to a failure in the electric boosting apparatus 16, the first hydraulic system 33 performs assist control of detecting the brake hydraulic pressure generated in the first and second hydraulic chambers 11A and 11B by the hydraulic sensor 29 connected to the second ECU 32, and increasing the pressure in each of the wheel cylinders so as to achieve the wheel cylinder pressure according to the detected value while handling this detected value as the operation amount of the brake pedal 5. In the assist control, the first hydraulic system 33 opens the pressurization control valve 50 and the pressure increase control valves 38 and 39, and opens and closes the supply control valve 37 and the pressure reduction control valves 42 and 43 as appropriate. In this state, the first hydraulic system 33 activates the hydraulic pump 44 by the electric motor 45, and supplies the brake fluid discharged from this hydraulic pump 44 to the wheel cylinders 3L and 4R via the first and second pipe conduit portions 35 and 36, respectively. By this operation, the braking force can be generated by the wheel cylinders 3L and 4R with use of the brake fluid discharged from the hydraulic pump 44 based on the brake hydraulic pressure generated on the master cylinder 8 side.

A known hydraulic pump such as a plunger pump, a trochoid pump, and a gear pump can be used as the hydraulic pump 44, but it is desirable that a gear pump is used as the hydraulic pump 44 from the viewpoint of mountability to the vehicle, tranquility, pump efficiency, and the like. A known motor such as a DC motor, a DC brushless motor, and an AC motor can be used as the electric motor 45, but, in the present embodiment, the DC motor is used as the electric motor 45 from the viewpoint of mountability to the vehicle and the like.

Further, a characteristic of each of the control valves 37, 38, 39, 42, 43, and 50 of the hydraulic supply apparatus 30 can be appropriately set according to respective use situations. Then, the hydraulic pressure can be supplied from the master cylinder 8 to the wheel cylinders 3L to 4R even when the control signal is not issued form the second ECU 32, by configuring the supply control valve 37 and the pressure increase control valves 38 and 39 as normally-opened valves, and the pressure reduction control valves 42 and 43 and the pressurization control valve 50 as normally-closed valves among those valves. Therefore, such a configuration is also desirable from the viewpoint of a fail-safe and control efficiency of the brake system.

A regenerative cooperative control apparatus 51 for charging power is connected to the vehicle data bus 28 mounted on the vehicle. The regenerative cooperative control apparatus 51 includes a microcomputer and the like similarly to the first and second ECUs 26 and 32, and functions to use an inertial force caused by the rotation of each of the wheels when, for example, the vehicle is slowed down or braked, and control a driving motor (not illustrated) for driving the vehicle, thereby acquiring the braking force while collecting motion energy at this time as power.

Then, the regenerative cooperative control apparatus 51 is connected to the first ECU 26 and the second ECU 32 via the vehicle data bus 28, and forms a regenerative braking control unit. Further, the regenerative cooperative control apparatus 51 is connected to the in-vehicle power line 52. This power line 52 functions to supply power from the in-vehicle battery (not illustrated) to the first and second ECUs 26 and 32, the regenerative cooperative control apparatus 51, and the like.

Next, a configuration of the control of the electric boosting apparatus 16 by the master pressure control unit (i.e., the first ECU 26) will be described with reference to FIG. 3.

The first ECU 26 includes a reference position characteristic calculation portion 53, a reference hydraulic characteristic calculation portion 54, a control switching portion 55, and a motor control portion 56. The reference position characteristic calculation portion 53 serves as a reference position characteristic calculation unit that determines a target position of the primary piston (the P piston), i.e., the booster piston 18 (hereinafter referred to as a target P piston position) with respect to a control input Sx (Sx=Sa). The reference hydraulic characteristic calculation unit serves as a reference hydraulic characteristic calculation unit that determines a target hydraulic pressure with respect to the control input Sx (Sx=Sb). The control switching portion 55 serves as a control switching unit. The motor control portion 56 serves as a motor control unit. These characteristic calculation portions 53 and 54, the control switching portion 55, and the motor control portion 56 are not constructed as hardware of the first ECU 26 in the form of a circuit, but are constructed as a concept of functions that the first ECU 26 has.

Now, the control switching portion 55 functions to determine which control mode is employed to perform control, positional control mode or hydraulic control mode, and perform this control. In the positional control mode, the first ECU 26 controls the activation of the electric motor 21 based on the target P piston position calculated by the reference position characteristic calculation portion 53 with respect to the control input Sx. In the hydraulic control mode, the first ECU 26 controls the activation of the electric motor 21 based on the target hydraulic pressure calculated by the reference hydraulic characteristic calculation portion 54 with respect to the control input Sx. The motor control portion 56 functions to control the driving of the electric motor 21 according to the target P piston position (or the target hydraulic pressure) determined by the above-described control switching portion 55.

As illustrated in FIG. 2, a memory 26A as a storage device is provided to the first ECU 26, and this memory 26A is constructed with use of a flash memory, an EEPROM, a ROM, a RAM, or the like. This memory 26A stores therein a reference position characteristic map, a reference hydraulic characteristic map, a program for processing for switching the control between the positional control mode and the hydraulic control mode illustrated in FIG. 6, which will be described below, and the like. In the reference position characteristic map, for example, a relationship between an operation amount S of the brake pedal 5 and a target position Po of the booster piston 18 is set as a characteristic line 57 with respect to a reference downstream stiffness predetermined for each vehicle on which the electric boosting apparatus 16 is mounted, like an example illustrated in FIG.

4. In the reference hydraulic characteristic map, a relationship between the operation amount S of the brake pedal 5 and a target hydraulic pressure Pr is set as a characteristic line 58 like an example illustrated in FIG. 5.

The downstream stiffness refers to a required fluid amount or a required hydraulic pressure of the brake fluid on the wheel cylinder 3L, 3R, 4L, and 4R side that applies the braking force to the vehicle, and it is known that the required fluid amount and the required hydraulic pressure on the wheel cylinders 3L, 3R, 4L, and 4R for achieving a target deceleration vary according to a use condition. More specifically, hardness of the frictional pad (not illustrated) mounted on each of the wheel cylinders 3L, 3R, 4L, and 4R changes according to the temperature and/or the wear degree. For example, it is known that the downstream stiffness tends to reduce when the temperature of the frictional pad increases and the frictional pad is softened, and increase when the wear of the frictional pad progresses and the frictional pad is hardened.

Figure 4:
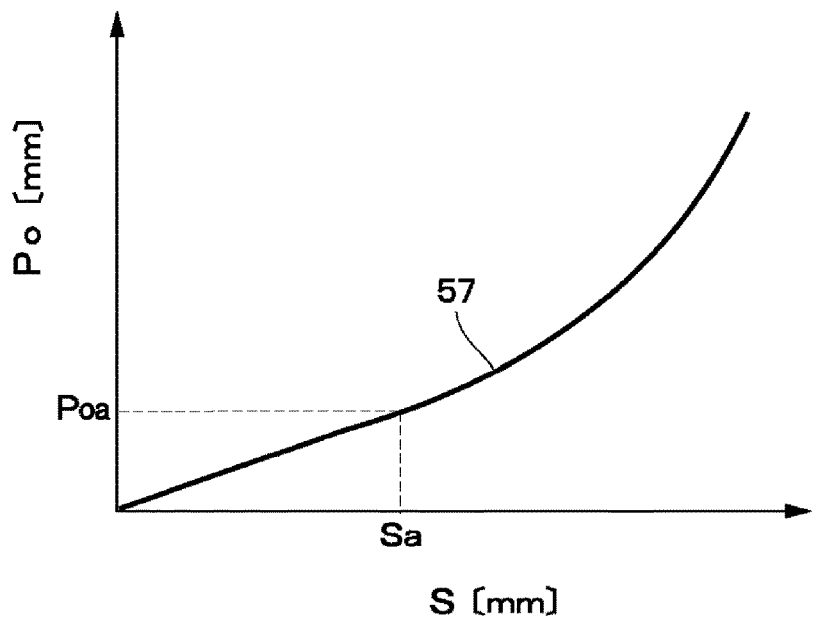
FIG. 4 is a graph indicating a characteristic line expressing a characteristic of a reference position in which a relationship between an operation amount of a brake pedal and a target position of a booster piston is set.

The reference position characteristic calculation portion 53 reads out the characteristic map defined by the characteristic line 57 of the reference position (the relationship of the target position Po of the booster piston 18 to the operation amount S of the brake pedal 5) illustrated in FIG. 4 from the memory 26A with use of, for example, the operation amount S of the brake pedal 5 as the control input Sa with respect to the preset reference downstream stiffness. After that, the reference position characteristic calculation portion 53 calculates the target P piston position (i.e., the target position Po of the booster piston 18) with respect to the control input Sa with use of this reference position characteristic map.

Figure 5:
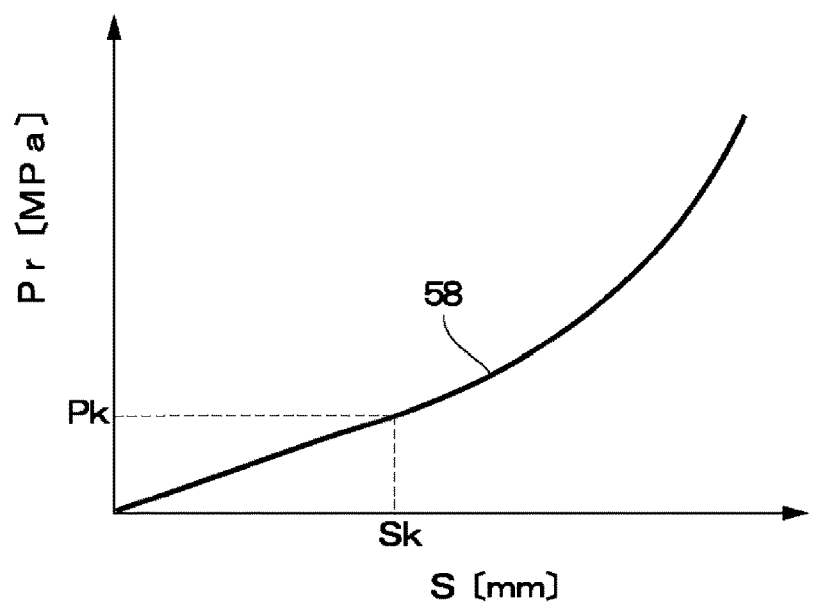
FIG. 5 is a graph indicating a characteristic line expressing a characteristic of a reference hydraulic pressure in which a relationship between the operation amount of the brake pedal and a target hydraulic pressure is set.

The reference hydraulic characteristic calculation portion 54 reads out the characteristic map defined by the characteristic line 58 of the reference hydraulic pressure (the relationship of the target hydraulic pressure Pr to the operation amount S of the brake pedal 5) illustrated in FIG. 5 from the memory 26A with use of, for example, the operation amount S of the brake pedal 5 as the control input Sb with respect to the preset reference downstream stiffness. After that, the reference hydraulic characteristic calculation portion 54 calculates the target hydraulic pressure with respect to the control input Sb with use of the reference hydraulic characteristic map.

The control switching portion 55 selects any one of the target P piston position calculated by the reference position characteristic calculation portion 53 and the target hydraulic pressure calculated by the reference hydraulic characteristic calculation portion 54 according to a predetermined determination condition. At this time, the control switching portion 55 may impose a limit on the target P piston position (or the target hydraulic pressure) according to the determination condition (for example, limiter processing illustrated in FIGS. 9 to 11, which will be described below), or correct the target P piston position (or the target hydraulic pressure).

The motor control portion 56 outputs a control driving signal to the electric motor 21 based on the target P piston position (or the target hydraulic pressure) selected by the control switching portion 55. By this operation, the motor control portion 56, which is a three-phase motor control circuit, controls the activation of the electric motor 21 of the electric boosting apparatus 16 so as to be able to acquire the target P piston position (or the target hydraulic pressure).

Next, the control switching portion 55 functions to switch the control to the control based on the target P piston position (i.e., the positional control mode) or the control based on the target hydraulic pressure (i.e., the hydraulic control mode). The control switching portion 55 will be specifically described. The control switching portion 55 switches the control mode between the positional control mode based on the target P piston position and the hydraulic control mode based on the hydraulic pressure by any of "switching of the control based on a switching reference hydraulic pressure), which will be described below, and "switching of the control based on a switching reference operation amount" according to a third embodiment illustrated in, for example, FIGS. 12 to 16, which will be described below.

Figure 6:
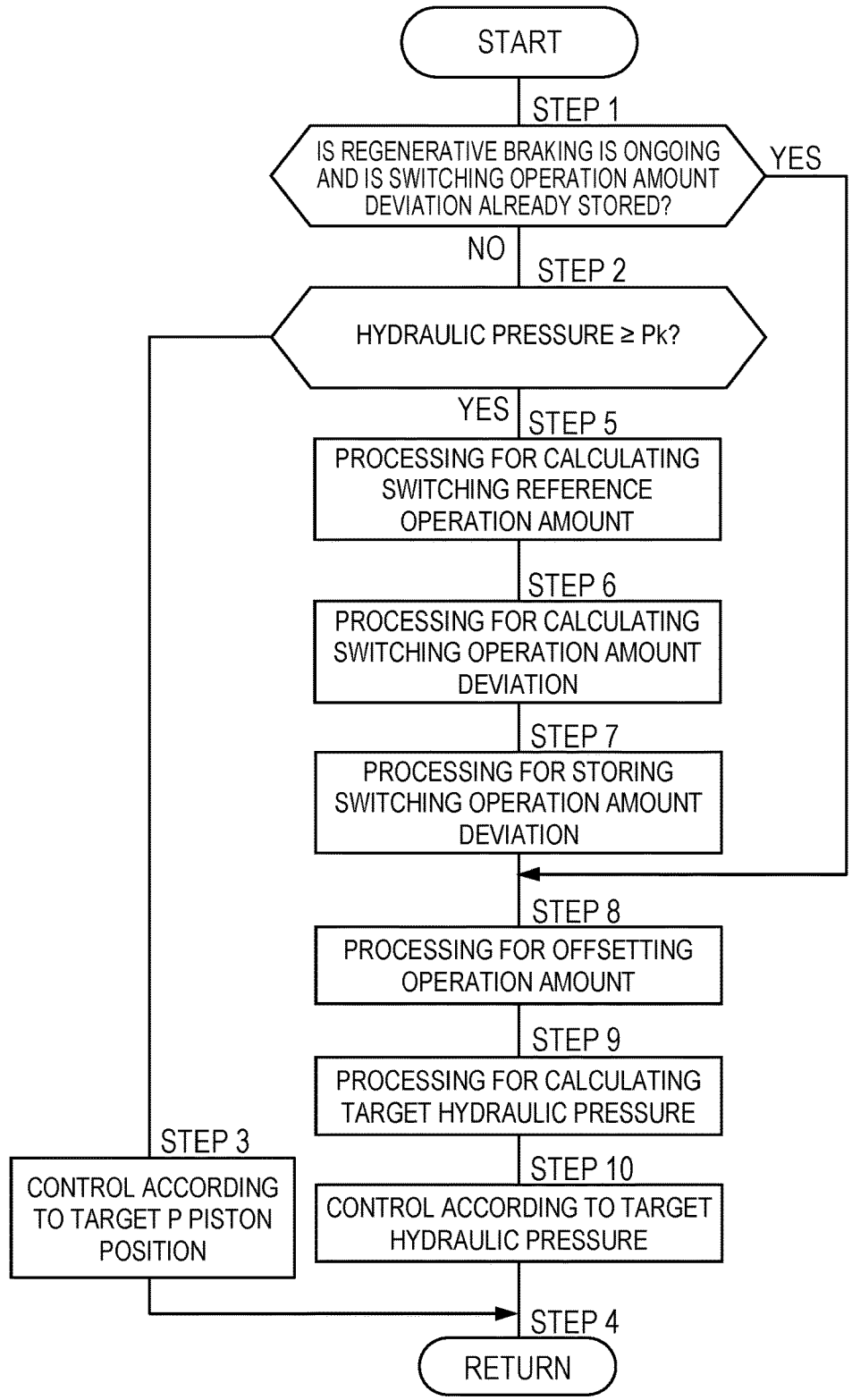
FIG. 6 is a flowchart illustrating brake control processing including processing for switching control between a positional control mode and a hydraulic control mode based on a switching reference hydraulic pressure according to a first embodiment.

Now, in the first embodiment, the control switching portion 55 functions to carry out the "switching of the control based on the switching reference hydraulic pressure", and performs the control according to the target P piston position in step 3 based on the control processing illustrated in FIG. 6 if the hydraulic pressure in the master cylinder 8 does not reach a preset predetermined hydraulic pressure (i.e., the switching reference hydraulic pressure). Then, the control switching portion 55 performs processing in steps 5 to 10 together with the motor control portion 56 if the hydraulic pressure in the master cylinder 8 reaches the preset switching reference hydraulic pressure Pk.

Therefore, the control switching portion 55 and the motor control portion 56 include a switching reference operation amount calculation processing unit, a switching operation amount deviation calculation unit, a switching operation amount deviation storage unit, an operation amount offset processing unit, a target hydraulic pressure calculation processing unit, and a motor control unit. The switching reference operation amount calculation processing unit calculates a switching reference operation amount Sk with respect to the switching reference hydraulic pressure Pk with use of the reference hydraulic characteristic illustrated in FIG. 5 (step 5 illustrated in FIG. 6). The switching operation amount deviation calculation unit calculates a switching operation amount deviation ΔS calculated from a deviation between the switching reference operation amount Sk and an operation amount S1 of the brake pedal 5 (refer to FIG. 7) (step 6 illustrated in FIG. 6). The switching operation amount deviation storage unit stores the switching operation amount deviation ΔS into the memory 26A in an updatable manner (step 7 illustrated in FIG. 6). The operation amount offset processing unit subtracts the switching operation amount deviation ΔS from the operation amount of the brake pedal 5, thereby offsetting the operation amount of the brake pedal 5 (step 8 illustrated in FIG. 6). The target hydraulic pressure calculation processing unit calculates the target hydraulic pressure with use of the offset operation amount of the brake pedal 5 and the reference hydraulic characteristic (for example, a characteristic line 59 illustrated in FIG. 7) (step 9 illustrated in FIG. 6). The motor control unit controls the motor according to the target hydraulic pressure calculated by this target hydraulic pressure calculation unit (step 10 illustrated in FIG. 6).

The brake control apparatus according to the present exemplary embodiment is configured in the above-described manner. Next, an operation thereof will be described.

First, when the driver of the vehicle operates the brake pedal 5 by pressing it, the input rod 19 is pressed in by this operation in the direction indicated by the arrow A, and the electric actuator 20 of the electric boosting apparatus 16 is also controlled to be activated by the first ECU 26. More specifically, the first ECU 26 outputs the activation instruction to the electric motor 21 according to the detection signal from the operation amount detector 7 to rotationally drive the electric motor 21, and this rotation is transmitted to the cylindrical rotational member 22 via the speed reduction mechanism 23 and the rotation of the cylindrical rotational member 22 is also converted into the axial displacement of the booster piston 18 by the linear motion mechanism 24.

As a result, the booster piston 18 of the electric boosting apparatus 16 advances generally integrally with the input rod 19 toward inside the cylinder main body 9 of the master cylinder 8, and the brake hydraulic pressure is generated in the first and second hydraulic chambers 11A and 11B of the master cylinder 8 by the amount corresponding to the pressing force (the thrust force) applied from the brake pedal 5 to the input rod 19 and the booster thrust force applied from the electric actuator 20 to the booster piston 18.

Further, the first ECU 26 monitors the hydraulic pressure generated in the master cylinder 8 by receiving the detection signal output from the hydraulic sensor 29 via the signal line 27, and performs the feedback control of the electric actuator 20 of the electric boosting apparatus 16 (the rotation of the electric motor 21). By this operation, the first ECU 26 can variably control the brake hydraulic pressure generated in the first and second hydraulic chambers 11A and 11B of the master cylinder 8 based on the pressing operation amount of the brake pedal 5. Further, the first ECU 26 can determine whether the electric boosting apparatus 16 normally operates according to the detection values of the operation amount detector 7 and the hydraulic sensor 29.

On the other hand, the input rod 19 coupled to the brake pedal 5 receives the pressure in the first hydraulic chamber 11A and transmits this pressure to the brake pedal 5 as the brake reaction force. As a result, this operation allows the driver of the vehicle to receive the response to the pressing via the input rod 19, and therefore can improve the operational feeling of the brake pedal 5 and keep the pedal feeling excellent.

In this manner, when the electric boosting apparatus 16 is controlled by the first ECU 16, the first ECU 16 activates the electric motor 21 to control the position of the booster piston 18, thereby causing the hydraulic pressure to be generated, based on the operation amount (the displacement amount, the pressing force, or the like) of the brake pedal 5, which is detected by the operation amount detector 7. At this time, the hydraulic pressure generated in the master cylinder 8 (the first hydraulic chamber 11A) becomes the reaction force and is fed back from the input rod 19 to the brake pedal 5. Then, a boosting ratio, which is a ratio between the operation amount of the brake pedal 5 and the generated hydraulic pressure, can be adjusted based on a ratio between pressure-receiving areas of the booster piston 18 and the input rod 19 and the positional relationship of the booster piston 18 to the input rod 19.

For example, a predetermined boosting ratio determined based on the ratio between the pressure-receiving areas of the input rod 19 and the booster piston 18 can be acquired by causing the booster piston 18 to follow the displacement of the input rod 19 and controlling the booster piston 18 in such a manner that the positional relationship of the booster piston 18 to the input rod 19 is kept constant. Further, the boosting ratio can be changed by multiplying the displacement of the input rod 19 by a proportional gain to change the positional relationship of the booster piston 18 to the input rod 19.

This adjustability can make the required braking force (hydraulic pressure) characteristic variable with respect to the set operation amount of the brake pedal 5, and make the vehicle deceleration variable with respect to the operation amount of the brake pedal 5 that is required by the driver, in consideration of the preset downstream stiffness. Further, a CAN signal is input from the regenerative cooperative control apparatus 51 (i.e., a regenerative braking system) to the first ECU 16 via the vehicle data bus 28, and the first ECU 16 can perform regenerative cooperative control of determining whether the regenerative braking is ongoing based on this activation signal, and adjusting the boosting ratio so as to generate a hydraulic pressure reduced by a braking force corresponding to the regenerative braking to thereby allow a desired braking force to be acquired as a sum of the braking force corresponding to the regenerative braking and the braking force due to the hydraulic pressure at the time of the regenerative braking.

Next, the hydraulic supply apparatus 30, which is provided between the wheel cylinder 3L, 3R, 4L, and 4R on each wheel side (the front wheels 1L and 1R and the rear wheels 2L and 2R) and the master cylinder 8, distributes and supplies the brake hydraulic pressure generated in the master cylinder (the first and second hydraulic chambers 11A and 11B) by the electric boosting apparatus 16 from the cylinder-side hydraulic pipes 15A and 15B to the wheel cylinder 3L, 3R, 4L, and 4R via the hydraulic systems 33 and 33' and the brake-side pipe portions 31A, 31B, 31C, and 31D in the hydraulic supply apparatus 30 as the wheel cylinder pressure for each of the wheels while variably controlling the brake hydraulic pressure. As a result, an appropriate braking force is applied for each of the wheels (each of the front wheels 1L and 1R and each of the rear wheels 2L and 2R) of the vehicle via the wheel cylinder 3L, 3R, 4L, and 4R.

Then, the second ECU 32, which controls the hydraulic supply apparatus 30, can monitor the pressing operation amount of the brake pedal 5 by receiving the detection signal output from the operation amount detector 7 via the signal line 27, and continue monitoring the brake hydraulic pressure based on the detection signal output from the hydraulic sensor 29. Then, at the time of the brake operation, the second ECU 32 can output the control signal to the electric motor 45 to activate the hydraulic pumps 44 and 44', and also selectively open and close each of the control valves 37, 37', 38, 38', 39, 39', 42, 42', 43, 43', 50, and 50', by receiving the detection signal output from the operation amount detector 7 via the communication.

Therefore, when, for example, the vehicle is braked, the hydraulic control apparatus 30 can individually increase, maintain, or reduce the brake hydraulic pressure to be supplied from the master cylinder 8 (and/or the hydraulic pumps 44 and 44') to each of the wheel cylinder 3L, 3R, 4L, and 4R according to the pressing operation on the brake pedal 5, and supply the brake hydraulic pressure corresponding to the operation of pressing the brake pedal 5, the diving state of the vehicle, and the like to each of the wheel cylinder 3L, 3R, 4L, and 4R and also highly accurately control the braking force of the vehicle.

Next, brake control processing by the first ECU 26 that is employed in the first embodiment will be described with reference to FIGS. 4 to 7.

When the processing operation illustrated in FIG. 6 is started, in step 1, the first ECU 26 performs processing for determining "whether the regenerative braking is ongoing and the switching operation amount deviation ΔS is already stored". More specifically, in step 1, the first ECU 26 determines whether the regenerative control is being performed by the regenerative cooperative control apparatus 51 for charging power, and the switching operation amount deviation ΔS, which will be described below, is also already stored in the memory 26A. Then, while the first ECU 26 determines "NO" in step 1, this means that the above-described regenerative control is not ongoing or processing for storing the switching operation amount deviation ΔS (step 7, which will be described below) is not yet performed, so that the operation proceeds to determination processing in the next step, step 2.

In the determination processing in step 2, the first ECU 26 determines whether the brake hydraulic pressure (the hydraulic pressure generated in the master cylinder 8) according to the detection signal from the hydraulic sensor 29 reaches the switching reference hydraulic pressure Pk as the preset predetermined hydraulic pressure. Now, the determination processing in step 2 is processing that determines whether the brake hydraulic pressure (the switching reference hydraulic pressure Pk) is generated in the first and second hydraulic chambers 11A and 11B of the master cylinder 8 according to the brake operation (in other words, whether the first supply port 9A and the second supply port 9B are disconnected from the first hydraulic chamber 11A and the second supply port 9B by the booster piston 18 and the second piston 10, respectively, and the hydraulic pressure is generated).

Therefore, while the first ECU 26 determines "NO" in step 2, the hydraulic pressure in the master cylinder 8 does not reach the switching reference hydraulic pressure Pk and the booster piston 18 is not displaced to the position at which the booster piston 18 disconnects the first supply port 9A in the master cylinder 8 (the cylinder main body 9) in the advancing direction (the direction indicated by the arrow A illustrated in FIG. 2), so that the operation proceeds to the next step, step 3, in which the first ECU 26 controls the position of the booster piston 18 according to the target P piston position.

In this control of the position of the booster piston 18, the first ECU 26 calculates the target position Po of the booster piston 18 with respect to the operation amount S of the brake pedal 5 (i.e., the control input Sa) as, for example, a target position Poa as illustrated in FIG. 4 according to the characteristic line 57 of the reference position illustrated in FIG. 4, and controls the driving of the electric motor 21 in such a manner that the booster piston 18 reaches the target position Poa. Then, the operation returns in the next step, step 4, and the first ECU 26 continues the processing in step 1 and the steps subsequent thereto.

Next, if the first ECU 26 determines "YES" in step 2, the first supply port 9A and the second supply port 9B are disconnected from the first hydraulic chamber 11A and the second hydraulic chamber 11B by the booster piston 18 and the second piston 10, respectively, and then the hydraulic pressure is generated. In other words, the brake hydraulic pressure in the master cylinder 8 that is detected by the hydraulic sensor 29 reaches the above-described switching reference hydraulic pressure Pk, so that the first ECU 26 performs processing for calculating the switching reference operation amount in the next step, step 5 to switch the control from the positional control to the hydraulic control. More specifically, the first ECU 26 calculates the switching reference operation amount Sk with respect to the switching reference hydraulic pressure Pk from the characteristic line 58 with use of the reference hydraulic characteristic illustrated in FIG. 5.

Figure 7:
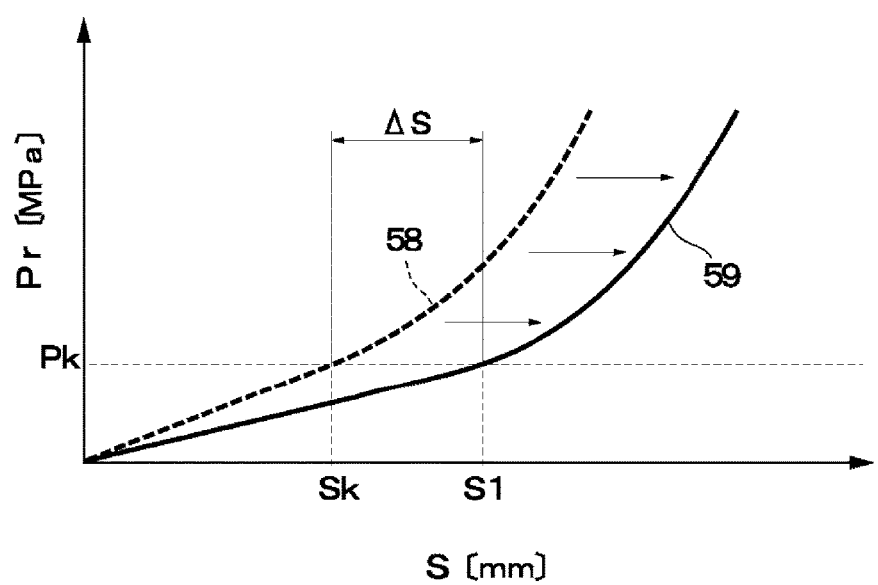
FIG. 7 is a graph indicating a characteristic line expressing a characteristic of the target hydraulic pressure offset with respect to the reference hydraulic characteristic as a relationship with the pedal operation amount.

Then, in the next step, step 6, the first ECU 26 performs processing for calculating the switching operation amount deviation. In this processing for calculating the switching operation amount deviation, the first ECU 26 calculates a deviation that is a difference between the switching reference operation amount Sk and the actual operation amount S1 of the brake pedal 5 (the actual operation amount detected by the operation detector 7) as the switching operation amount deviation ΔS (ΔS=S1−Sk) as illustrated in FIG. 7. The actual operation amount S1 of the brake pedal 5 corresponds to the control input Sb input to the reference hydraulic characteristic calculation portion 54 illustrated in FIG. 3.

In the next step, step 7, the first ECU 26 stores the switching operation amount deviation ΔS calculated in step 6 into the memory 26A in an updatable manner.

In the next step, step 8, the first ECU 26 performs processing for changing the operation amount (i.e., processing for offsetting the operation amount). In this processing for offsetting the operation amount, the first ECU 26 changes the operation amount by subtracting the switching operation amount deviation ΔS from the operation amount of the brake pedal 5 to offset the operation amount of the brake pedal 5. Subsequently, in step 9, the first ECU 26 performs processing for calculating the target hydraulic pressure. In this processing for calculating the target hydraulic pressure, the first ECU 26 calculates a characteristic of the target hydraulic pressure offset from the characteristic line 58 (the reference hydraulic characteristic) indicated by a dotted line in FIG. 7 as a characteristic line 59 indicated by a solid line with use of the reference hydraulic characteristic from the operation amount of the brake pedal 5 that has been offset as described above.

Then, in the next step, step 10, the first ECU 26 performs the control based on the target hydraulic pressure according to the characteristic line 59 indicated by the solid line in FIG. 7. More specifically, the first ECU 26 controls the driving of the electric motor 21 to move the booster piston 18 in the axial direction of the master cylinder 8 (the cylinder main body 9) in such a manner that the brake hydraulic pressure generated from the master cylinder 8 matches the characteristic of the target hydraulic pressure defined by the characteristic line 59 with respect to the operation amount S of the brake pedal 5 that is input form the driver. After that, the operation returns in step 4, and the first ECU 26 continues the control processing in step 1 and the steps subsequent thereto.

On the other hand, the first ECU 26 determines "YES" in step 1 when the regenerative control is being performed by the regenerative cooperative control apparatus 51 for charging power and the above-described switching operation amount deviation ΔS is also already stored in the memory 26A. In this case, the operation proceeds to step 8 in which the first ECU 26 performs the processing for offsetting the operation amount, without the processing in steps 2 to 7 performed. In the processing for offsetting the operation amount in this case, the first ECU 26 subtracts the switching operation amount deviation ΔS already stored in the memory 26A from the operation amount of the brake pedal 5, thereby offsetting the operation amount of the brake pedal 5.

In the next step, step 9, the first ECU 26 performs the processing for calculating the target hydraulic pressure. However, the target hydraulic pressure in this case is calculated so as to generate the hydraulic pressure with the braking force corresponding to the regenerative braking subtracted therefrom because the vehicle is performing the regenerative cooperative control of allowing the desired braking force to be acquired as the sum of the braking force corresponding to the regenerative braking and the braking force due to the hydraulic pressure. Then, in the next step, step 10, the first ECU 26 performs the control based on the target hydraulic pressure calculated in step 9, and the operation returns in the next step, step 4.

In this manner, at the time of the regenerative cooperation, the hydraulic pressure that should be generated in the master cylinder 8 is a hydraulic pressure in which the hydraulic pressure corresponding to the regenerative braking is subtracted from the required hydraulic pressure compared to acquiring the braking force only by the braking due to the hydraulic pressure with respect to the pedal operation of the driver (the braking request). Therefore, when the braking force corresponding to the braking due to the regenerative braking is provided as the hydraulic pressure or an amount in proportional to the hydraulic pressure, controlling the activation of the electric motor 21 in the hydraulic control mode based on the target hydraulic pressure can simplify the calculation and also improve control accuracy compared to the control based on the target P piston position (i.e., the positional control mode).

Further, the CAN signal from the regenerative cooperative control apparatus 51 is input to the first ECU 26 (i.e., the master pressure control unit) via the vehicle data bus 28 that carries out the CAN communication, and the first ECU 26 determines whether the regenerative braking is ongoing based on this signal. By this determination, the first ECU 26 can adjust the output of the electric boosting apparatus 16 so as to generate the hydraulic pressure with the braking force corresponding to the regenerative braking subtracted therefrom, and realize the regenerative cooperative control of allowing the desired braking force to be acquired as the sum of the braking force corresponding to the regenerative braking and the braking force due to the hydraulic pressure, during the regenerative control.

In this manner, in the first embodiment configured in this manner, the brake control apparatus can realize the brake characteristic according to the change in the downstream stiffness by performing the processing for calculating the switching reference operation amount, the processing for calculating the switching operation amount deviation, the processing for storing the switching operation amount deviation, the processing for offsetting the operation amount, the processing for calculating the target hydraulic pressure, and the motor control according to the target hydraulic pressure illustrated in FIG. 6, even when the downstream stiffness in the brake hydraulic circuit changes due to the variation in the calipers forming a part of the wheel cylinders 3L, 3R, 4L, and 4R, the temperature, the wear degree, and the deterioration of the frictional pad, and/or the like.

In other words, according to the first embodiment, the brake control apparatus can limit an excessive movement amount of the booster piston 18 (the primary piston) and prevent or reduce a pedal change due to the booster piston 18 by changing the reference hydraulic characteristic according to the change in the downstream stiffness. Further, the brake control apparatus changes the brake operation amount by the switching operation amount deviation in the reference hydraulic characteristic. As a result, the brake control apparatus can prevent a sudden change in the brake characteristic and realize a smooth brake feeling.

On the other hand, use of a fixed reference hydraulic characteristic while the downstream stiffness changes, like the conventional technique, leads to an increase in the brake fluid amount for satisfying the target hydraulic pressure depending on the downstream stiffness, thereby raising a possibility of reducing responsiveness. However, according to the first embodiment, the brake control apparatus does not use the fixed reference hydraulic characteristic while the downstream stiffness changes unlike the conventional technique, and therefore can realize a low reference hydraulic characteristic when the downstream stiffness is low and a high reference hydraulic characteristic when the downstream stiffness is high.

Therefore, in the first embodiment, the brake control apparatus can prevent or reduce the generation of the difference between the actual hydraulic pressure in the master cylinder 8 that is generated actually, and the target hydraulic pressure, and prevent or reduce a change in the vehicle deceleration with respect to the operation amount of the brake pedal when switching the control from the positional control to the hydraulic control. As a result, according to the first embodiment, the brake control apparatus can prevent or reduce an uncomfortable feeling brought about to the driver regardless of the change in the downstream stiffness in the hydraulic circuit due to the variation in the calipers forming a part of the wheel cylinders 3L, 3R, 4L, and 4R, the temperature, the wear degree, and the deterioration of the frictional pad, and/or the like.

Further, in the first embodiment, the brake control apparatus is configured to determine whether the switching operation amount deviation ΔS is already calculated and stored when performing the regenerative cooperative control by the regenerative cooperative apparatus 51 for charging power. Therefore, when the switching operation amount deviation ΔS is stored in advance, the brake control apparatus can realize the brake characteristic according to the downstream stiffness without generating the brake hydraulic pressure from the master cylinder 8 at all when the braking operation is performed in, for example, a hybrid vehicle or an electric automobile.

Second Embodiment

Next, FIGS. 8 to 11 illustrate a second embodiment of the present invention. The second embodiment is characterized in that the brake control apparatus is configured to impose a limit on the deviation between the actual operation amount of the brake pedal and the switching reference operation amount, and set the switching operation amount deviation within a range defined by this limit value. In the second embodiment, similar components to the above-described first embodiment will be identified by the same reference numerals and descriptions thereof will be omitted.

Figure 8:
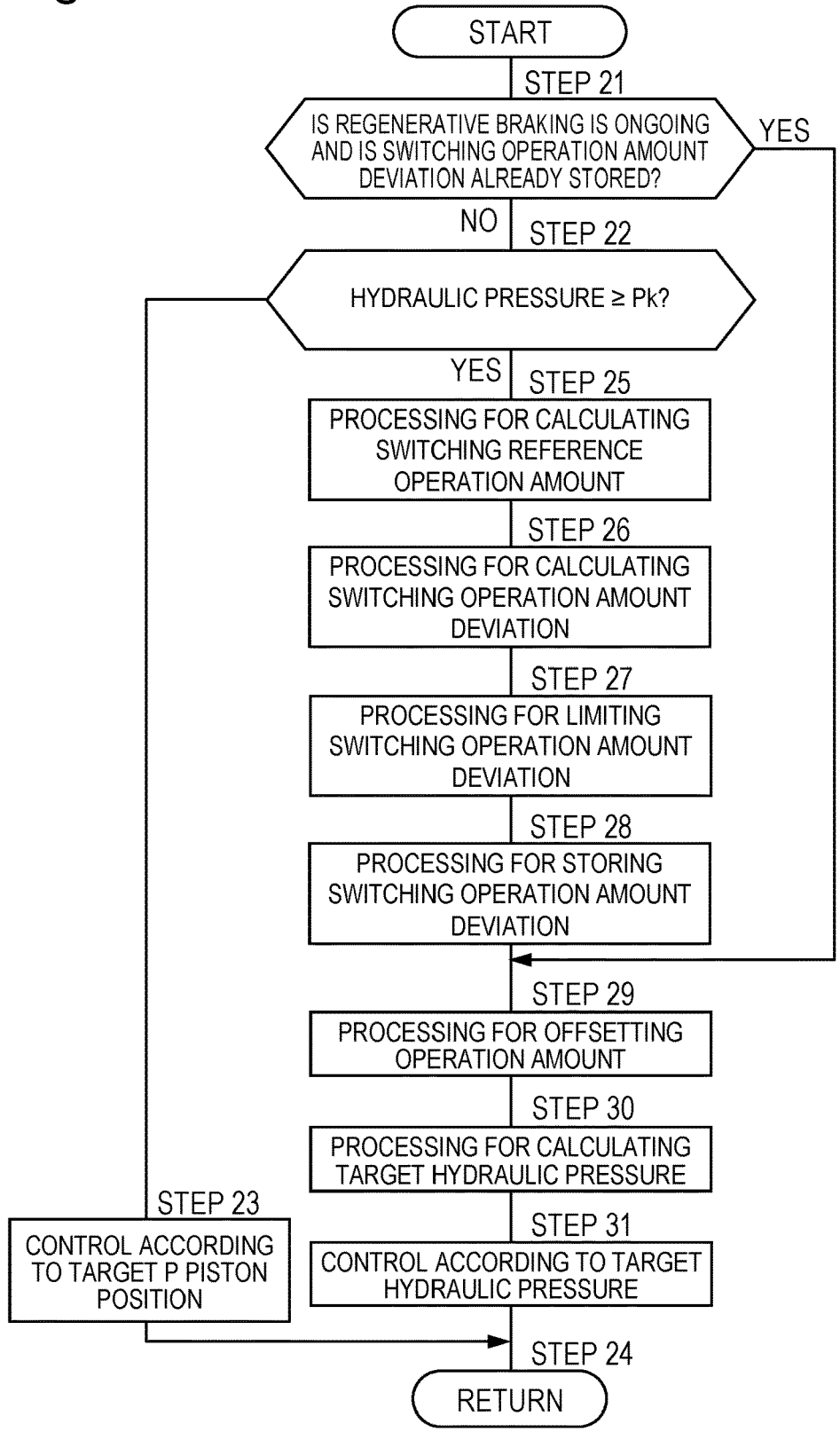
FIG. 8 is a flowchart illustrating brake control processing including processing for switching the control between the positional control mode and the hydraulic control mode based on the switching reference hydraulic pressure according to a second embodiment.

Then, when a processing operation illustrated in FIG. 8 is started, in step 21, the first ECU 26 determines whether the regenerative control is being performed by the regenerative cooperative control apparatus 51 for charging power and the switching operation amount deviation ΔS is already stored in the memory 26A similarly to step 1 illustrated in FIG. 6, which has been described in the above-described first embodiment. Then, while the first ECU 26 determines "NO" in step 21, this means that the above-described regenerative control is not ongoing or the processing for storing the switching operation amount deviation ΔS is not yet performed, so that the operation proceeds to determination processing in the next step, step 22.

Next, in processing in steps 22 to 26, similar processing to steps 2 to 6 illustrated in FIG. 6, which have been described in the above-described first embodiment, is performed. In the next step, step 27, the first ECU 26 performs processing for limiting the switching operation amount deviation on the switching operation amount deviation ΔS calculated in step 26 as limiter processing according to any of processing for limiting the switching operation amount deviation by an upper limit illustrated in FIG. 9, processing for limiting the switching operation amount deviation by a lower limit illustrated in FIG. 10, and processing for limiting a change width of the switching operation amount deviation illustrated in FIG. 11, which will be described below.

In the next step, step 28, the first ECU 26 stores the switching operation amount deviation ΔS set within the range defined by the predetermined limit value by the execution of the processing for limiting the switching operation amount deviation in the above-described step, step 27, into the memory 26A in an updatable manner. Then, the first ECU 26 performs processing in the next steps, steps 29 to 31 in a similar manner to steps 8 to 10 illustrated in FIG. 6, which have been described in the above-described first embodiment.

Figure 9:
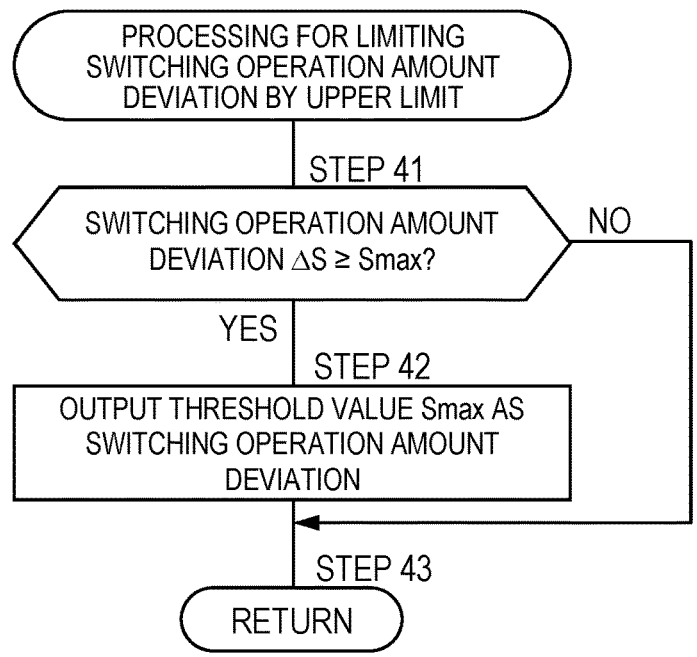
FIG. 9 is a flowchart illustrating processing for limiting a switching operation amount deviation by an upper limit according to processing for limiting the switching operation amount deviation illustrated in FIG. 8.

Next, the processing for limiting the switching operation amount deviation by the upper limit for performing the processing for limiting the switching operation amount deviation on the switching operation amount deviation ΔS (step 27) will be described with reference to FIG. 9. In step 41, the first ECU 26 determines whether the switching operation amount deviation ΔS is equal to or greater than a threshold value Smax, which is a predetermined upper limit. In this case, the switching operation amount deviation ΔS is the deviation calculated in step 26 illustrated in FIG. 8, and the change in the brake characteristic may become excessive when this switching operation amount deviation ΔS becomes equal to or greater than the threshold value Smax, which is the upper limit. In other words, in an operation region where the operation of the brake pedal 5 achieves a full stroke, the change in the vehicle deceleration with respect to the operation is slowed down. In other words, the effect of the brake may undesirably reduce to fall short of the driver's intention.

Therefore, if the first ECU 26 determines "YES" in step 41, in the next step, step 42, the first ECU 26 replaces the switching operation amount deviation ΔS with the above-described threshold value Smax, and outputs this threshold value Smax as the switching operation amount deviation ΔS. Then, the operation returns in the next step, step 43. By this replacement, in step 28 illustrated in FIG. 8, the first ECU 26 stores the threshold value Smax as the switching operation amount deviation ΔS. Then, in the processing for offsetting the operation amount in the next step, step 29, the first ECU 26 subtracts the switching operation amount deviation ΔS (ΔS=Smax) from the operation amount of the brake pedal 5, thereby offsetting the operation amount of the brake pedal 5. Then, the first ECU 26 performs processing in step 30 and steps subsequent thereto based thereon.

On the other hand, if the first ECU 26 determines "NO" in step 41, the operation returns in the next step, step 43 without changing the switching operation amount deviation ΔS calculated in step 26 illustrated in FIG. 8. As a result, the processing from steps 28 to 31 illustrated in FIG. 8 is performed in the exactly same manner as the processing in steps 7 to 10 illustrated in FIG. 6 according to the above-described first embodiment.

Figure 10:
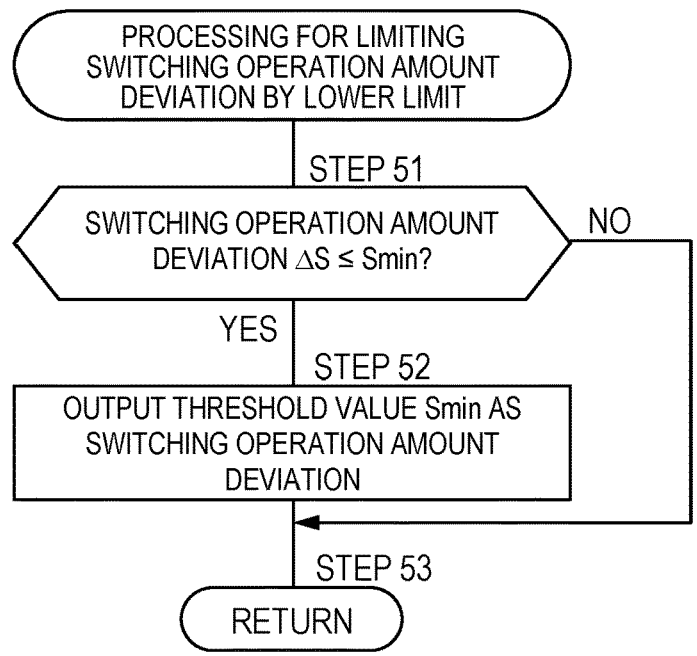
FIG. 10 is a flowchart illustrating processing for limiting the switching operation amount deviation by a lower limit according to the processing for limiting the switching operation amount deviation illustrated in FIG. 8.

Next, the processing for limiting the switching operation amount deviation by the lower limit, which is illustrated in FIG. 10, will be described. In step 51, the first ECU 26 determines whether the switching operation amount deviation ΔS is equal to or smaller than a threshold value Smin, which is a predetermined lower limit. In this case, the switching operation amount deviation ΔS is the deviation calculated in step 26 illustrated in FIG. 8, and the change in the brake characteristic is small when this switching operation amount deviation ΔS is equal to or smaller than the threshold value Smin, which is the lower limit. In other words, when the above-described deviation is equal to or smaller than the threshold value Smin, which is the lower limit, the change in the downstream stiffness is small, so that even replacing the switching operation amount deviation ΔS with the threshold value Smin does not raise a substantial problem with the control of the brake hydraulic pressure, and therefore can realize the brake characteristic according to the change in the downstream stiffness.

Then, if the first ECU 26 determines "YES" in step 51, in the next step, step 52, the first ECU 26 replaces the switching operation amount deviation ΔS with the above-described threshold value Smin, and outputs this threshold value Smin as the switching operation amount deviation ΔS. Then, the operation returns in the next step, step 53. By this replacement, in step 28 illustrated in FIG. 8, the first ECU 26 stores the threshold value Smin as the switching operation amount deviation ΔS. Then, in the processing for offsetting the operation amount in the next step, step 29, the first ECU 26 subtracts the switching operation amount deviation ΔS (ΔS=Smin) from the operation amount of the brake pedal 5, thereby offsetting the operation amount of the brake pedal 5. Then, the first ECU 26 performs the processing in step 30 and the steps subsequent thereto based thereon.

On the other hand, if the first ECU 26 determines "NO" in step 51, the operation returns in the next step, step 53 without changing the switching operation amount deviation ΔS calculated in step 26 illustrated in FIG. 8. This leads to the execution of the processing from steps 28 to 31 illustrated in FIG. 8 in the same manner as the processing in steps 7 to 10 illustrated in FIG. 6 according to the above-described first embodiment.

Figure 11:
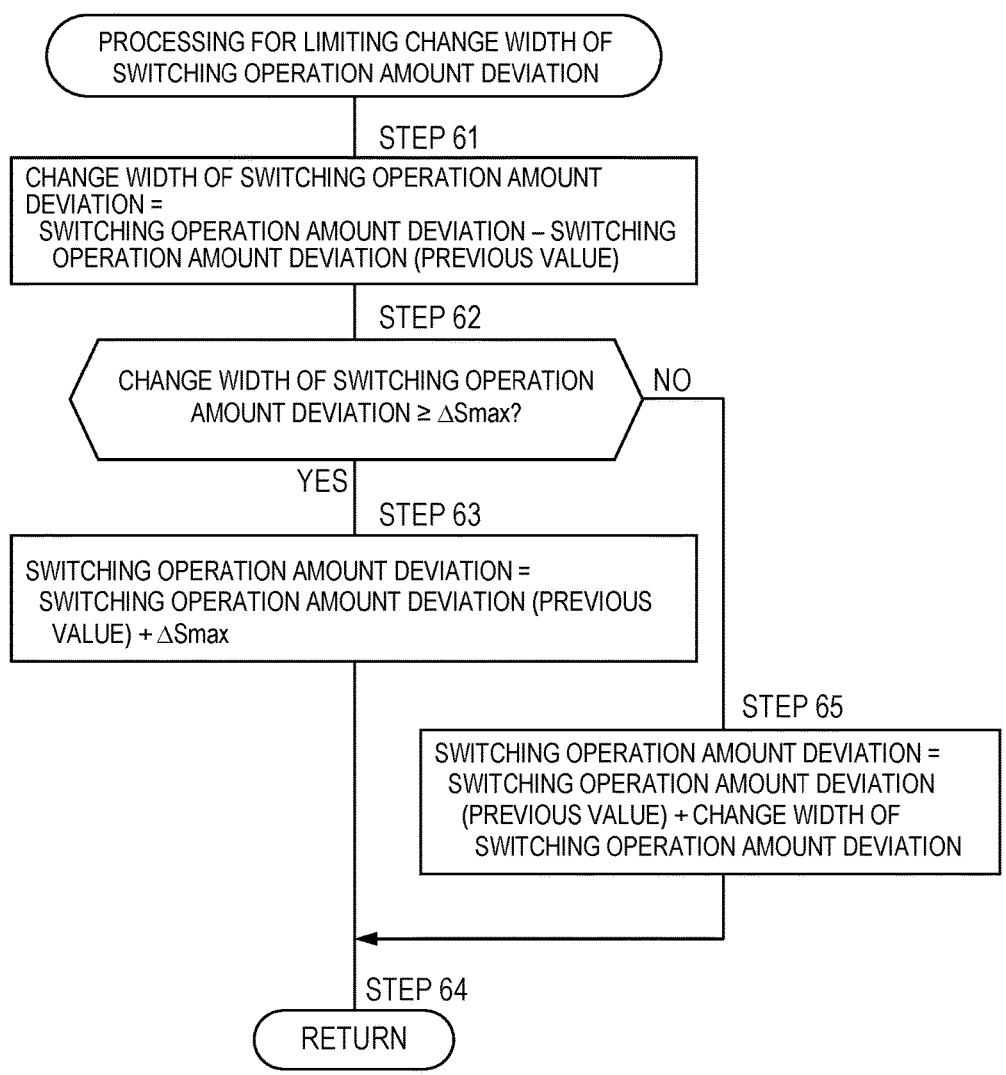
FIG. 11 is a flowchart illustrating processing for limiting a change width of the switching operation amount deviation according to the processing for limiting the switching operation amount deviation illustrated in FIG. 8.

Next, the processing for limiting the change width of the switching operation amount deviation, which is illustrated in FIG. 11, will be described. In step 61, the first ECU 26 subtracts the previous switching operation amount deviation ΔS (a previous value) from the current switching operation amount deviation ΔS (a current value), and calculates the change width of the switching operation amount deviation as [the current value–the previous value]. In the next step, step 62, the first ECU 26 determines whether the above-described change width of the switching operation amount deviation is equal to or greater than a predetermined threshold value ΔSmax for the change width. In this case, when the change width of the switching operation amount deviation becomes equal to or greater than the threshold value ΔSmax, the change in the brake characteristic becomes excessive, and the change in the vehicle deceleration with respect to the operation on the brake pedal is sped up. In other words, the vehicle may be undesirably suddenly braked without the user's intention.

Therefore, if the first ECU 26 determines "YES" in step 62, the operation proceeds to the next step, step 63, in which the first ECU 26 adds the previous switching operation amount deviation ΔS (the previous value) and the above-described threshold value ΔSmax, and outputs this added value (a sum) as the switching operation amount deviation ΔS. Then, the operation returns in the next step, step 64. By this calculation, the first ECU 26 stores the above-described added values as the switching operation amount deviation ΔS in step 28 illustrated in FIG. 8, and subtracts the switching operation amount deviation ΔS that is the above-described added value from the operation amount of the brake pedal 5, thereby offsetting the operation amount of the brake pedal 5 so as to prevent the stiffness from excessively increasing in the processing for offsetting the operation amount in the next step, step 29. Then, the first ECU 26 performs the processing in step 30 and the steps subsequent thereto based thereon.

On the other hand, if the first ECU 26 determines "NO" in step 62, in the next step, step 65, the first ECU 26 adds the previous switching operation amount deviation ΔS (the previous value) and the above-described change width of the operation amount deviation, and calculates this added value (a sum) as the switching operation amount deviation ΔS. In other words, in this case, the operation returns in the next step, step 64 without changing the switching operation amount deviation ΔS (the current value) calculated in step 26 illustrated in FIG. 8. This leads to the execution of the processing from steps 28 to 31 illustrated in FIG. 8 in the same manner to the processing from steps 7 to 10 illustrated in FIG. 6 according to the above-described first embodiment.

In this manner, in the second embodiment configured in this manner, the brake control apparatus can realize the brake characteristic according to the downstream stiffness by storing the switching operation amount deviation similarly to the above-described first embodiment. In addition, in the second embodiment, the brake control apparatus is configured to impose the limit on the deviation between the actual operation amount of the brake pedal and the switching reference operation amount, and set the switching operation amount deviation within the range defined by this limit value.

Therefore, the brake control apparatus can limit an excessive movement amount of the booster piston 18 (the P piston) and prevent or reduce a pedal change due to the booster piston 18 by changing the reference hydraulic characteristic according to the change in the downstream stiffness. In a case where imposing the limit on the switching operation amount deviation results in a shift of the characteristic of the target hydraulic pressure, the present embodiment can be still realized by configuring the brake control apparatus to interpolate a characteristic line therebetween.

Third Embodiment

Next, FIGS. 12 to 16 illustrate a third embodiment of the present invention. In the third embodiment, similar components to the above-described first and second embodiments will be identified by the same reference numerals and descriptions thereof will be omitted. However, the third embodiment is characterized in that the brake control apparatus is configured to switch the control to the control based on the target P piston position or the control based on the target hydraulic pressure based on the switching reference operation amount.

Figure 3:
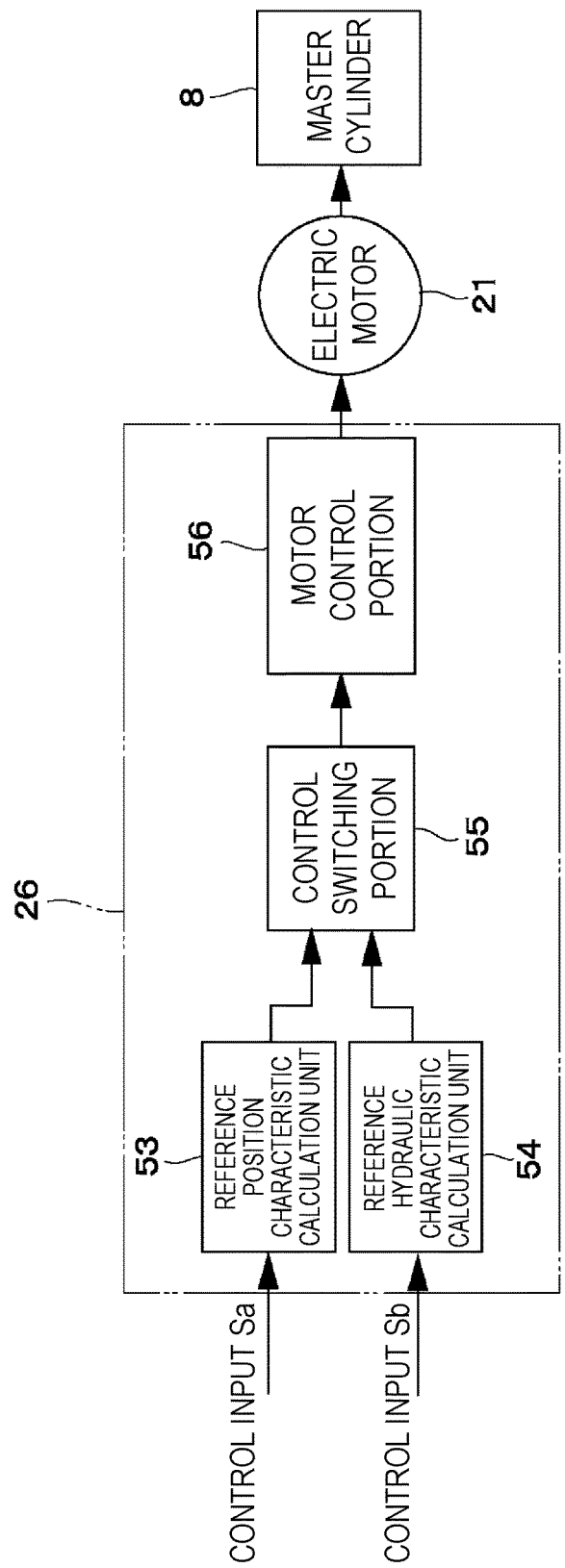
FIG. 3 is a control brock diagram of an ECU that controls driving of the electric boosting apparatus illustrated in FIG. 2.

In other words, in the third embodiment, the control switching portion 55 illustrated in FIG. 3 does not carry out the "switching of the control based on the switching reference hydraulic pressure" like the above-described first and second embodiments, and carries out the "switching of the control based on the switching reference operation amount". Further, in the third embodiment, the brake control apparatus is configured to set a limit on a deviation between the target hydraulic pressure based on the actual operation amount of the brake pedal and the switching reference hydraulic pressure, and set a switching hydraulic deviation within a range defined by this limit value.

Figure 12:
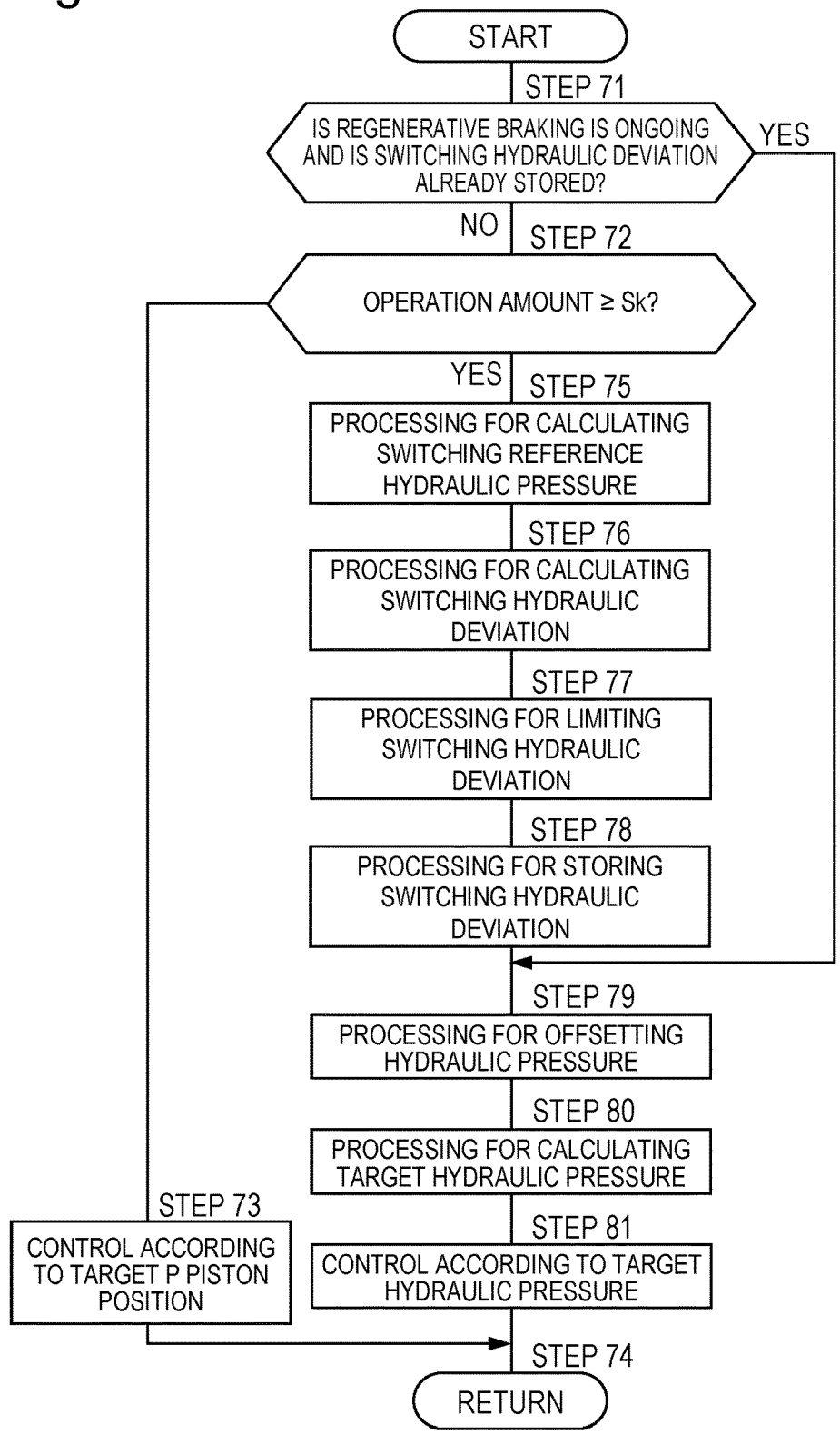
FIG. 12 is a flowchart illustrating brake control processing including processing for switching the control between the positional control mode and the hydraulic control mode based on a switching reference operation amount according to a third embodiment.

Then, when a processing operation illustrated in FIG. 12 is started, in step 71, the first ECU 26 determines whether the regenerative control is being performed by the regenerative cooperative control apparatus 51 for charging power and the switching hydraulic deviation ΔP, which will be described below, is already stored in the memory 26A of the first ECU 26. Then, while the first ECU 26 determines "NO" in step 71, this means that the above-described regenerative control is not ongoing or processing for storing the switching hydraulic deviation ΔP is not yet performed, so that the operation proceeds to determination processing in the next step, step 72.

In step 72, the first ECU 26 determines whether the operation amount S of the brake pedal 5 indicated by the detection signal from the operation amount detector 7 (the control input Sa illustrated in FIG. 3) reaches the preset switching reference operation amount Sk. The switching reference operation amount Sk in this case may be any of a different value from or the same value as the switching reference operation amount Sk illustrated in FIG. 5, which has been described in the above-described first embodiment.

The determination processing in the above-described step, step 72 is processing that determines whether the operation amount S of the brake pedal 5 according to the brake operation reaches the switching reference operation amount Sk corresponding to a so-called dead stroke (in other words, whether the first supply port 9A and the second supply port 9B are disconnected from the first hydraulic chamber 11A and the second hydraulic chamber 11B by the booster piston 18 and the second piston 10, respectively, and then the hydraulic pressure is generated).

Therefore, while the first ECU 26 determines "NO" in step 72, the operation amount S of the brake pedal 5 does not reach the switching reference operation amount Sk and the booster piston 18 is not displaced to the position at which the booster piston 18 disconnects the first supply port 9A in the master cylinder 8 (the cylinder main body 9) in the advancing direction (the direction indicated by the arrow A illustrated in FIG. 2), so that the operation proceeds to the next step, step 73, in which the first ECU 26 controls the position of the booster piston 18 according to the target P piston position in a similar manner to the processing in step 3 according to the above-described first embodiment. Then, the operation returns in the next step, step 74, in which the first ECU 26 continues the processing in step 71 and the steps subsequent thereto.

Next, if the first ECU 26 determines "YES" in step 72, this means that the operation amount S of the brake pedal 5 reaches the above-described switching reference operation amount Sk, so that the first ECU 26 performs the processing for calculating the switching reference hydraulic pressure in the next step, step 75. More specifically, the first ECU 26 calculates a switching reference hydraulic pressure Pk with respect to the switching reference operation amount Sk from the characteristic line 58 with use of the reference hydraulic characteristic illustrated in FIG. 5.

Figure 13:
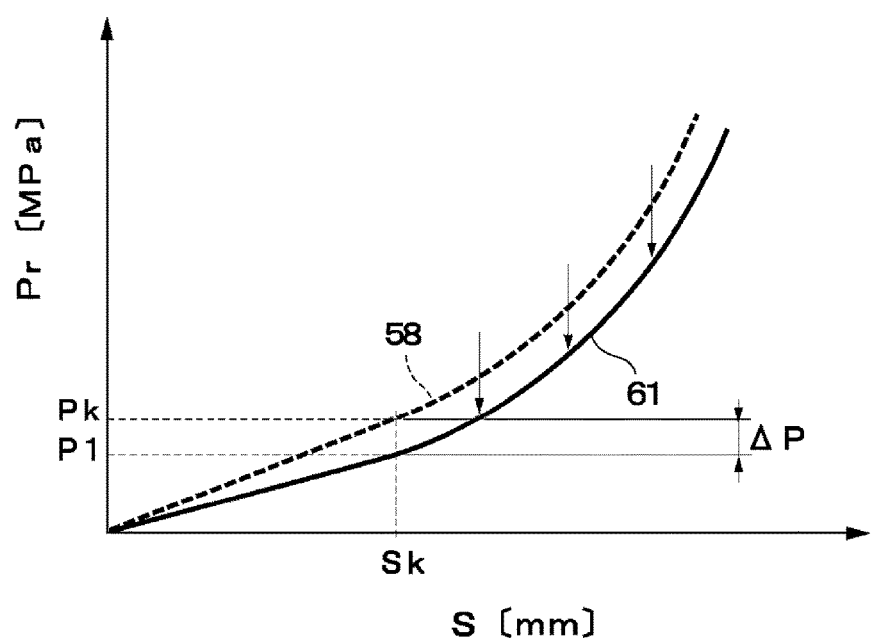
FIG. 13 is a graph indicating a characteristic line expressing the characteristic of the target hydraulic pressure offset with respect to the reference hydraulic characteristic as the relationship with the pedal operation amount.

Then, in the next step, step 76, the first ECU 26 performs processing for calculating the switching hydraulic deviation. This processing for calculating the switching hydraulic deviation is processing that calculates a deviation that is a difference between the above-described switching reference hydraulic pressure Pk and a hydraulic pressure P1 generated from the master cylinder 8 (the actual brake hydraulic pressure detected by the hydraulic sensor 29) as the switching hydraulic deviation ΔP (ΔP=Pk−P1) as illustrated in FIG. 13.

Figure 14:
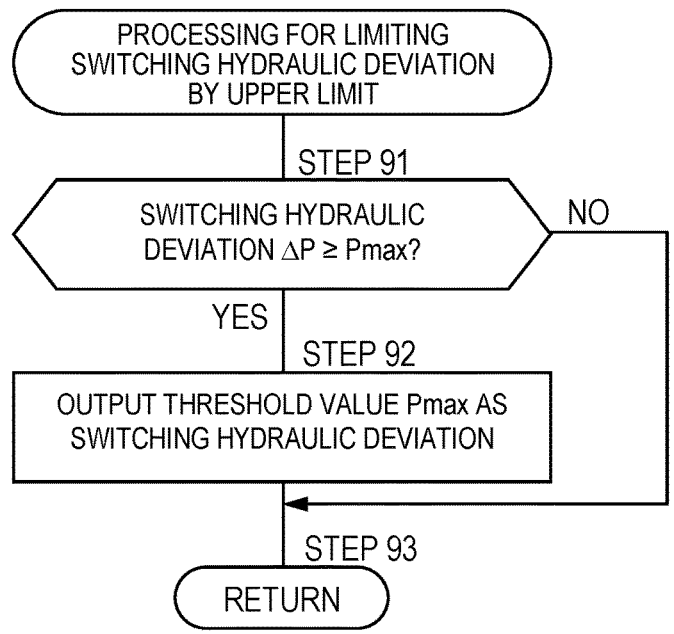
FIG. 14 is a flowchart illustrating processing for limiting a switching hydraulic deviation by an upper limit according to processing for limiting the switching hydraulic deviation illustrated in FIG. 12.
Figure 16:
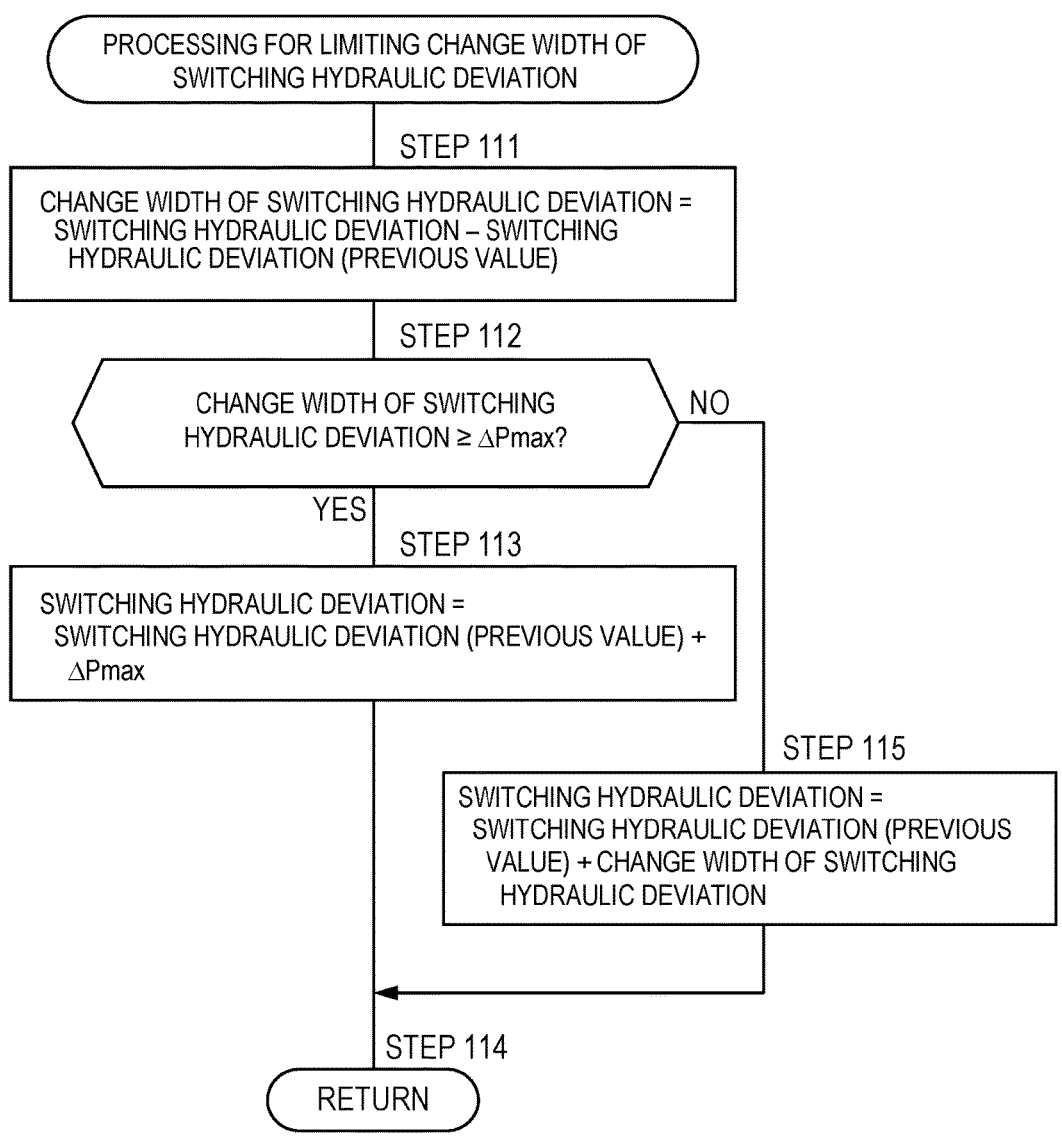
FIG. 16 is a flowchart illustrating processing for limiting a change width of the switching hydraulic deviation according to the processing for limiting the switching hydraulic deviation illustrated in FIG. 12.

In the next step, step 77, the first ECU 26 performs processing for limiting the switching hydraulic deviation on the switching hydraulic deviation ΔP calculated in step 76 as limiter processing according to any of processing for limiting the switching hydraulic deviation by an upper limit illustrated in FIG. 14, processing for limiting the switching hydraulic deviation by a lower limit illustrated in FIG. 5, and processing for limiting a change width of the switching hydraulic deviation illustrated in FIG. 16, which will be described below.

In the next step, step 78, the first ECU 26 performs processing for storing the switching hydraulic deviation. More specifically, the switching hydraulic deviation ΔP set within the range defined by the predetermined limit value by the execution of the processing for limiting the switching hydraulic deviation in the above-described step, step 77 is stored into the memory 26A in an updatable manner by the processing for storing the switching hydraulic deviation in step 78.

In the next step, step 79, the first ECU 26 performs processing for offsetting the hydraulic pressure (processing for changing the hydraulic pressure). In this processing for offsetting the hydraulic pressure, the first ECU 26 changes the hydraulic pressure so as to subtract the switching hydraulic deviation ΔP (the deviation ΔP stored in the memory 26A) from the target hydraulic pressure calculated from the operation amount of the brake pedal 5 to offset the target hydraulic pressure by an amount corresponding to this deviation ΔP. Next, in step 80, the first ECU 26 performs processing for calculating the target hydraulic pressure. In this processing for calculating the target hydraulic pressure, the first ECU 26 calculates a characteristic of the target hydraulic pressure offset from the characteristic line 58 (the reference hydraulic characteristic) indicated by a dotted line in FIG. 13 as a characteristic line 61 indicated by a solid line with use of the reference hydraulic characteristic from the operation amount of the brake pedal 5 that has been offset as described above.

Then, in the next step, step 81, the first ECU 26 performs the motor control based on the target hydraulic pressure according to the characteristic line 61 indicated by the solid line in FIG. 13. More specifically, the first ECU 26 controls the driving of the electric motor 21 to move the booster piston 18 in the axial direction of the master cylinder 8 (the cylinder main body 9) in such a manner that the brake hydraulic pressure generated from the master cylinder 8 matches the characteristic of the target hydraulic pressure defined by the characteristic line 61 with respect to the operation amount S of the brake pedal 5 that is input form the driver. After that, the operation returns in step 74, and the first ECU 26 continues the control processing in step 71 and the steps subsequent thereto.

On the other hand, the first ECU 26 determines "YES" in step 71 when the regenerative control is being performed by the regenerative cooperative control apparatus 51 for charging power and the above-described switching hydraulic deviation ΔP is also already stored in the memory 26A. In this case, the operation proceeds to step 79 in which the first ECU 26 performs the processing for offsetting the hydraulic pressure (processing for changing the hydraulic pressure), without the processing in steps 72 to 78 performed. In the processing for offsetting the hydraulic pressure in this case, the first ECU 26 subtracts the switching hydraulic deviation ΔP already stored in the memory 26A from the target hydraulic pressure based on the operation amount of the brake pedal 5, thereby offsetting (changing) the target hydraulic pressure based on the operation amount of the brake pedal 5 by an amount corresponding to the above-described deviation ΔP.

In the next step, step 80, the first ECU 26 performs the processing for calculating the target hydraulic pressure. However, the target hydraulic pressure in this case is calculated so as to generate the hydraulic pressure with the braking force corresponding to the regenerative braking subtracted therefrom because the vehicle is performing the regenerative cooperative control of allowing the desired braking force to be acquired as the sum of the braking force corresponding to the regenerative braking and the braking force due to the hydraulic pressure. Then, in the next step, step 81, the first ECU 26 performs the control based on the target hydraulic pressure according to the characteristic line 61 indicated by the solid line in FIG. 13, and the operation returns in the next step, step 74.

Next, the processing for limiting the switching hydraulic deviation by the upper limit for performing the processing for limiting the switching hydraulic deviation on the switching hydraulic deviation ΔP (step 77) will be described with reference to FIG. 14. In step 91 illustrated in FIG. 14, the first ECU 26 determines whether the switching hydraulic deviation ΔP is equal to or greater than a threshold value Pmax, which is a predetermined upper limit. In this case, the switching hydraulic deviation ΔP is the deviation calculated in step 76 illustrated in FIG. 12, and the change in the brake characteristic may become excessive when this switching hydraulic deviation ΔP becomes equal to or greater than the threshold value Pmax, which is the upper limit. In other words, in the operation region where the operation of the brake pedal 5 approaches a full stroke, the change in the vehicle deceleration with respect to the operation is slowed down. In other words, the effect of the brake may undesirably reduce to fall short of the driver's intention.

Therefore, if the first ECU 26 determines "YES" in step 91, in the next step, step 92, the first ECU 26 replaces the switching hydraulic deviation ΔP with the above-described threshold value Pmax, and outputs this threshold value Pmax as the switching hydraulic deviation ΔP. Then, the operation returns in the next step, step 93. By this replacement, in step 78 illustrated in FIG. 12, the first ECU 26 stores the threshold value Pmax as the switching hydraulic deviation ΔP. Then, in the processing for offsetting the hydraulic pressure in the next step, step 79, the first ECU 26 subtracts the switching hydraulic deviation ΔP (ΔP=Pmax) from the target hydraulic pressure based on the operation amount of the brake pedal 5, thereby offsetting the target hydraulic pressure based on the operation amount of the brake pedal 5. Then, the first ECU 26 performs the processing in step 80 and the steps subsequent thereto based thereon.

On the other hand, if the first ECU 26 determines "NO" in step 91, the operation returns in the next step, step 93 without changing the switching hydraulic deviation ΔP calculated in step 76 illustrated in FIG. 12. As a result, the processing from steps 78 to 81 illustrated in FIG. 12 is performed in the same manner to the above description based on the switching hydraulic deviation ΔP calculated in step 76.

Figure 15:
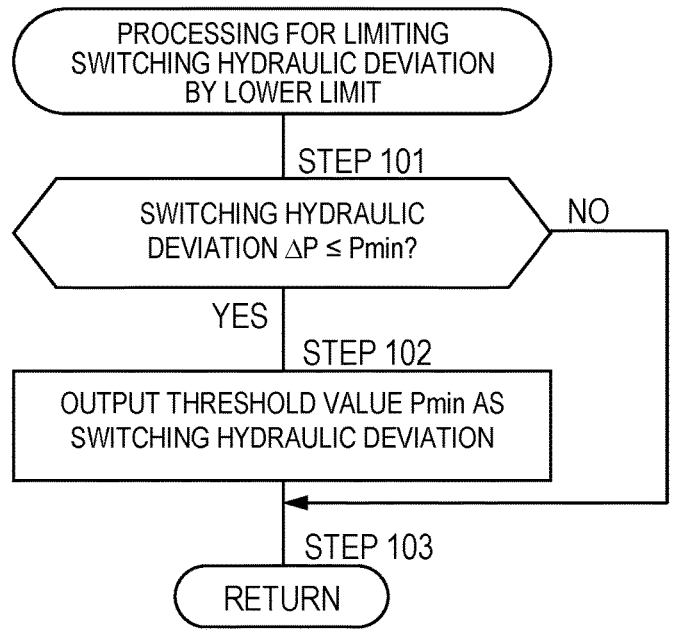
FIG. 15 is a flowchart illustrating processing for limiting the switching hydraulic deviation by a lower limit according to the processing for limiting the switching hydraulic deviation illustrated in FIG. 12.

Next, the processing for limiting the switching hydraulic deviation by the lower limit, which is illustrated in FIG. 15, will be described. In step 101, the first ECU 26 determines whether the switching hydraulic deviation ΔP is equal to or smaller than a threshold value Pmin, which is a predetermined lower limit. In this case, the switching hydraulic deviation ΔP is the deviation calculated in step 76 illustrated in FIG. 12, and the change in the brake characteristic is small when this switching hydraulic deviation ΔP is equal to or smaller than the threshold value Pmin, which is the lower limit. In other words, when the above-described deviation is equal to or smaller than the threshold value Pmin, which is the lower limit, the change in the downstream stiffness is small, so that even replacing the switching hydraulic deviation ΔP with the threshold value Pmin does not raise a substantial problem with the control of the brake hydraulic pressure, and therefore can realize the brake characteristic according to the change in the downstream stiffness.

Then, if the first ECU 26 determines "YES" in step 101, in the next step, step 102, the first ECU 26 replaces the switching hydraulic deviation ΔP with the above-described threshold value Pmin, and outputs this threshold value Pmin as the switching hydraulic deviation ΔP. Then, the operation returns in the next step, step 103. By this replacement, in step 78 illustrated in FIG. 12, the first ECU 26 stores the threshold value Pmin as the switching hydraulic deviation ΔP. Then, in the processing for offsetting the hydraulic pressure in the next step, step 79, the first ECU 26 subtracts the switching hydraulic deviation ΔP (ΔP=Pmin) from the target hydraulic pressure based on the operation amount of the brake pedal 5, thereby offsetting the target hydraulic pressure based on the operation amount of the brake pedal 5. Then, the first ECU 26 performs the processing in step 80 and the steps subsequent thereto based thereon.

On the other hand, if the first ECU 26 determines "NO" in step 101, the operation returns in the next step, step 103 without changing the switching hydraulic deviation ΔP calculated in step 76 illustrated in FIG. 12. This leads to the execution of the processing from steps 78 to 81 illustrated in FIG. 12 in the same manner to the above description based on the switching hydraulic deviation ΔP calculated in step 76.

Next, the processing for limiting the change width of the switching hydraulic deviation, which is illustrated in FIG. 16, will be described. In step 121, the first ECU 26 subtracts the previous switching hydraulic deviation ΔP (a previous value) from the current switching hydraulic deviation ΔP (a current value), and calculates the change width of the switching hydraulic deviation as [the current value−the previous value]. In the next step, step 112, the first ECU 26 determines whether the above-described change width of the switching hydraulic deviation is equal to or greater than a predetermined threshold value ΔPmax for the change width. In this case, when the change width of the switching hydraulic deviation becomes equal to or greater than the threshold value ΔPmax, the change in the brake characteristic becomes excessive, and the change in the vehicle deceleration with respect to the operation on the brake pedal is sped up. In other words, the vehicle may be undesirably suddenly braked without the user's intention.

Therefore, if the first ECU 26 determines "YES" in step 112, the operation proceeds to the next step, step 113, in which the first ECU 26 adds the above-described threshold value ΔPmax to the previous switching hydraulic deviation ΔP (the previous value), and outputs this added value (a sum) as the switching hydraulic deviation ΔP. Then, the operation returns in the next step, step 114. By this calculation, the first ECU 26 stores the above-described added values as the switching hydraulic deviation ΔP in step 78 illustrated in FIG. 12, and subtracts the switching hydraulic deviation ΔP that is the above-described added value from the target hydraulic pressure based on the operation amount of the brake pedal 5, thereby offsetting the target hydraulic pressure based on the operation amount of the brake pedal 5 in the processing for offsetting the hydraulic pressure in the next step, step 79. Then, the first ECU 26 performs the processing in step 80 and the steps subsequent thereto based thereon.

On the other hand, if the first ECU 26 determines "NO" in step 112, in the next step, step 115, the first ECU 26 adds the previous switching hydraulic deviation ΔP (the previous value) and the above-described change width of the hydraulic deviation, and calculates this added value (a sum) as the switching hydraulic deviation ΔP. In other words, in this case, the operation returns in the next step, step 114 without changing the switching hydraulic deviation ΔP (the current value) calculated in step 76 illustrated in FIG. 12. This leads to the execution of the processing from steps 78 to 81 illustrated in FIG. 12 in the same manner to the above description based on the switching hydraulic deviation ΔP calculated in step 76.

In this manner, in the third embodiment configured in this manner, the brake control apparatus can also realize the brake characteristic according to the change in the downstream stiffness similarly to the above-described first embodiment, by performing the processing for calculating the switching reference hydraulic pressure, the processing for calculating the switching hydraulic deviation, the processing for storing the switching hydraulic deviation, the processing for offsetting the hydraulic pressure, the processing for calculating the target hydraulic pressure, and the motor control according to the target hydraulic pressure illustrated in FIG. 12, even when the stiffness in the brake hydraulic circuit (i.e., the downward stiffness) changes due to the variation in the calipers forming a part of the wheel cylinders 3L, 3R, 4L, and 4R, the temperature, the wear degree, and the deterioration of the frictional pad, and/or the like.

Further, in the third embodiment, the brake control apparatus is configured to determine whether the switching hydraulic deviation ΔP is already calculated and stored when performing the regenerative cooperative control by the regenerative cooperative apparatus 51 for charging power. Therefore, when the switching hydraulic deviation ΔP is stored in advance, the brake control apparatus can realize the brake characteristic according to the downstream stiffness without generating the brake hydraulic pressure from the master cylinder 8 at all when the braking operation is performed in, for example, a hybrid vehicle or an electric automobile. Further, the brake control apparatus can realize the brake characteristic according to the downstream stiffness without generating the hydraulic pressure at all in the hybrid vehicle and the electric automobile, by storing the switching hydraulic deviation ΔP in the updatable manner.

Further, in the third embodiment, the brake control apparatus is configured to set the limit on the deviation between the target hydraulic pressure based on the actual operation amount of the brake pedal and the switching reference hydraulic pressure, and set the switching hydraulic deviation within the range defined by this limit value. Therefore, the brake control apparatus can limit an excessive movement amount of the primary piston (the booster piston 18) and prevent or reduce a pedal change due to the primary piston by changing the reference hydraulic characteristic according to the change in the downstream stiffness. Further, the brake control apparatus can prevent a sudden change in the brake characteristic and realize a smooth brake feeling by offsetting the brake operation amount by the switching hydraulic deviation ΔP in the reference hydraulic characteristic.

In each of the above-described embodiments, the brake control apparatus has been described based on the example using the reference position or hydraulic characteristic map indicated by the characteristic line 57 or 58, such as the example illustrated in FIG. 4 or 5. However, the present invention is not limited thereto, and these characteristic maps (i.e., the reference characteristics) may be set in a different manner as long as they are set as an individual characteristic of each vehicle based on a reference downstream stiffness predetermined for each vehicle including the electric boosting apparatus mounted thereon.

In the above-described first embodiment, the brake control apparatus has been described based on the example configured to perform the regenerative cooperative control by the regenerative cooperative control apparatus 51 for charging power. However, the present invention is not limited thereto, and can also be applied even to a vehicle unequipped with, for example, the regenerative cooperative control apparatus for charging power and may be configured to omit the processing in steps 1 and 7 illustrated in FIG. 6 in this case. Such a change in the configuration shall also be applicable to the second and third embodiments.

In the above-described first embodiment, the brake control apparatus has been described based on the example configured to set the switching reference hydraulic pressure Pk as the hydraulic pressure for determining whether the brake hydraulic pressure is generated in the first and second hydraulic chambers 11A and 11B of the master cylinder 8. However, the present invention is not limited thereto, and, for example, the switching reference hydraulic pressure Pk can also be set to a predetermined hydraulic pressure other than that. Then, such a change in the configuration shall also be applicable to the second and third embodiments.

In the above-described manner, according to the brake control apparatus of the present embodiment, the control switching unit is configured to switch the control between the positional control and the hydraulic control according to the hydraulic value detected by the hydraulic detection unit.

Then, when the "switching of the control based on the switching reference hydraulic pressure" is performed, the predetermined hydraulic pressure is the preset switching reference hydraulic pressure, and the control switching unit is configured to switch the control from the positional control to the hydraulic control when the hydraulic value detected by the hydraulic detection unit reaches the switching reference hydraulic pressure. Then, the control switching unit includes the switching reference operation amount calculation unit configured to calculate the operation amount with respect to the switching reference hydraulic pressure that is set in the reference hydraulic characteristic when the hydraulic value detected by the hydraulic detection unit reaches the switching reference hydraulic pressure. The switching reference operation amount calculation unit is configured to calculate the switching reference operation amount with respect to the switching reference hydraulic pressure that is set in the reference hydraulic characteristic when the hydraulic value detected by the hydraulic detection unit reaches the switching reference hydraulic pressure.

Further, the control switching unit includes the switching operation amount deviation calculation unit configured to calculate the deviation with respect to the operation amount detected by the operation amount detection unit and the switching reference operation amount calculated by the switching reference operation amount calculation unit. The switching operation amount deviation calculation unit is configured to calculate the deviation between the operation amount detected by the operation amount detection unit and the switching reference operation amount calculated by the switching reference operation amount calculation unit as the switching operation amount deviation. Then, the control switching unit includes the operation amount change processing (operation amount offset processing) unit configured to change the operation amount detected by the operation amount detection unit with use of the switching operation amount deviation calculated by the switching operation amount deviation calculation unit when the target hydraulic pressure is calculated from the operation amount detected by the operation amount detection unit based on the reference hydraulic characteristic. The operation amount change processing unit is configured to calculate the target hydraulic pressure from the reference hydraulic characteristic by changing the operation amount detected by the operation amount detection unit according to the switching operation amount deviation from the operation amount detected by the operation amount detection unit, when the target hydraulic pressure is calculated from the operation amount detected by the operation amount detection unit based on the reference hydraulic characteristic.

On the other hand, the control switching unit includes the switching operation amount deviation storage unit configured to store the switching operation amount deviation into the storage device when the switching operation amount deviation calculation unit calculates the switching operation amount deviation. The switching operation amount deviation storage unit is configured to store the switching operation amount deviation as the operation amount deviation. Then, the control switching unit includes the switching operation amount deviation limit unit configured to use the upper or lower limiter or the change width limiter when the switching operation amount deviation is stored by the switching operation amount deviation storage unit. The switching operation amount deviation limit unit is configured to limit the switching operation amount deviation to be stored by the switching operation amount deviation storage unit by limiting the switching operation amount deviation by the upper limit or the lower limit or limiting the change width from the already stored operation amount deviation with use of the upper or lower limiter or the change width limiter, when the switching operation amount deviation is stored by the switching operation amount deviation storage unit.

The control switching unit includes the operation amount change processing unit configured to change the operation amount detected by the operation amount detection unit with use of the operation amount deviation stored by the switching operation amount deviation storage unit when the target hydraulic pressure is calculated from the operation amount detected by the operation amount detection unit based on the reference hydraulic characteristic. The operation amount change processing unit is configured to calculate the target hydraulic pressure from the reference hydraulic characteristic by changing the operation amount detected by the operation amount detection unit according to the operation amount deviation from the operation amount detected by the operation amount detection unit, when the target hydraulic pressure is calculated from the operation amount detected by the operation amount detection unit based on the reference hydraulic characteristic.

By being configured in the above-described manner, the brake control apparatus can realize a low reference hydraulic characteristic when the downstream stiffness is low. Then, the brake control apparatus can realize a high reference hydraulic characteristic when the downstream stiffness is high. The brake control apparatus can realize the brake characteristic according to the downstream stiffness without generating the hydraulic pressure at all in a hybrid vehicle and an electric automobile, by storing the switching operation amount deviation in the updatable manner. Further, the brake control apparatus can limit an excessive movement amount of the primary piston and prevent or reduce a pedal change due to the primary piston by changing the reference hydraulic characteristic according to the change in the downstream stiffness. Further, the brake control apparatus can prevent a sudden change in the brake characteristic and realize a smooth brake feeling by offsetting the brake operation amount by the switching operation amount deviation in the reference hydraulic characteristic.

On the other hand, when the "switching of the control based on the switching reference operation amount" is performed, the predetermined operation amount is the preset switching reference operation amount, and the control switching unit is configured to switch the control from the positional control to the hydraulic control when the operation amount detected by the operation amount detection unit reaches the switching reference operation amount. Then, the control switching unit includes the switching reference hydraulic calculation unit configured to calculate the hydraulic value with respect to the switching reference operation amount that is set in the reference hydraulic characteristic when the operation amount detected by the operation amount detection unit reaches the switching reference operation amount. The switching reference hydraulic calculation unit is configured to calculate the switching reference hydraulic pressure with respect to the switching reference operation amount that is set in the reference hydraulic characteristic, when the operation amount detected by the operation amount detection unit reaches the switching reference operation amount.

Further, the control switching unit includes the switching hydraulic deviation calculation unit configured to calculate the deviation with respect to the hydraulic value detected by the hydraulic detection unit and the switching reference hydraulic pressure calculated by the switching reference hydraulic calculation unit. The switching hydraulic deviation calculation unit is configured to calculate the deviation between the hydraulic value detected by the hydraulic detection unit and the switching reference hydraulic pressure calculated by the switching reference hydraulic calculation unit as the switching hydraulic deviation. Further, the control switching unit includes the hydraulic change processing (hydraulic offset processing) unit configured to change the hydraulic value calculated from the operation amount detected by the operation amount detection unit based on the reference hydraulic characteristic with use of the switching hydraulic deviation calculated by the switching hydraulic deviation calculation unit when the target hydraulic pressure is calculated from the operation amount detected by the operation amount detection unit based on the reference hydraulic characteristic. The hydraulic change processing unit is configured to calculate the target hydraulic pressure from the reference hydraulic characteristic by changing the hydraulic value calculated from the operation amount detected by the operation amount detection unit based on the reference hydraulic characteristic according to the switching hydraulic deviation calculated by the switching hydraulic deviation calculation unit, as the hydraulic value calculated from the operation amount detected by the operation amount detection unit based on the reference hydraulic characteristic.

On the other hand, the control switching unit includes the switching hydraulic deviation storage unit configured to store the switching hydraulic deviation into the storage device when the switching hydraulic deviation calculation unit calculates the switching hydraulic deviation. The switching hydraulic deviation storage unit is configured to store the switching hydraulic deviation as the hydraulic deviation. Further, the control switching unit includes the switching hydraulic deviation limit unit configured to use the upper or lower limiter or the change width limiter when the switching hydraulic deviation is stored by the switching hydraulic deviation storage unit. The switching hydraulic deviation limit processing is configured to limit the switching hydraulic deviation to be stored by the switching hydraulic deviation storage unit by limiting the switching hydraulic deviation by the upper limit or the lower limit or limiting the change width from the already stored hydraulic deviation with use of the upper or lower limiter or the change width limiter and then calculating the hydraulic deviation, when the switching hydraulic deviation is stored by the switching hydraulic deviation storage unit.

The control switching unit includes the hydraulic change processing (hydraulic offset processing) unit configured to change the hydraulic value calculated from the operation amount detected by the operation amount detection unit based on the reference hydraulic characteristic with use of the hydraulic deviation stored by the switching hydraulic deviation storage unit when the target hydraulic pressure is calculated from the operation amount detected by the operation amount detection unit based on the reference hydraulic characteristic. The hydraulic change processing unit is configured to calculate the target hydraulic pressure from the reference hydraulic characteristic by changing the hydraulic value calculated from the operation amount detected by the operation amount detection unit based on the reference hydraulic characteristic according to the hydraulic deviation stored by the switching hydraulic deviation storage unit from the hydraulic value calculated from the operation amount detected by the operation amount detection unit based on the reference hydraulic characteristic.

Having described merely several embodiments of the present invention, those skilled in the art will be able to easily appreciate that the embodiments described as the examples can be modified or improved in various manners without substantially departing from the novel teachings and advantages of the present invention. Therefore, such modified or improved embodiments are intended to be also contained in the technical scope of the present invention. The above-described embodiments may also be arbitrarily combined.

The present application claims priority under the Paris Convention to Japanese Patent Application No. 2015-073576 filed on Mar. 31, 2015. The entire disclosure of Japanese Patent Application No. 2015-073576 filed on Mar. 31, 2015 including the specification, the claims, the drawings, and the abstract is incorporated herein by reference in its entirety.

REFERENCE SIGN LIST 1L, 1R front wheel (wheel)
2L, 2R rear wheel (wheel)
3L, 3R, 4, 4L, 4R wheel cylinder
5 brake pedal
7 operation amount detector (operation amount detection unit)
8 master cylinder
11A, 11B hydraulic chamber
16 electric boosting apparatus
18 booster piston (P piston)
19 input rod (input member)
20 electric actuator
21 electric motor
21A rotational sensor (piston position detection unit)
26 first ECU (control unit)
26A memory (storage device)
27 signal line
28 vehicle data bus
29 hydraulic sensor (hydraulic detection unit)
30 hydraulic supply apparatus (ESC)
32 second ECU 51 regenerative cooperative control apparatus (regenerative braking control unit)
53 reference position characteristic calculation portion (reference position characteristic calculation unit)
54 reference hydraulic characteristic calculation portion (reference hydraulic characteristic calculation unit)
55 control switching portion (control switching unit)
56 motor control portion (motor control unit)
57 characteristic line (reference position characteristic)
58 characteristic line (reference hydraulic characteristic)
59, 61 characteristic line (characteristic of offset target hydraulic pressure)
Pk switching reference hydraulic pressure
ΔP switching hydraulic deviation
Sk switching reference operation amount
ΔS switching operation amount deviation

The invention claimed is:

1. A brake control apparatus comprising:
an electric motor configured to move a piston of a master cylinder;
an operation amount detection unit configured to detect an operation amount of a brake pedal;
a piston position detection unit configured to detect a piston position in the master cylinder; and
a control unit configured to control the electric motor based on the operation amount detected by the operation amount detection unit,
wherein, in the control unit, a reference position characteristic and a reference hydraulic characteristic are preset, the reference position characteristic indicating a relationship between the operation amount and the piston position, the reference hydraulic characteristic indicating a relationship between the operation amount and a hydraulic value generated in the master cylinder, which is detected by a hydraulic detection unit,
wherein the control unit further includes a control switching unit configured to switch control between positional control of controlling the electric motor based on the reference position characteristic with respect to the operation amount detected by the operation amount detection unit, and hydraulic control of controlling the electric motor based on the reference hydraulic characteristic with respect to the operation amount detected by the operation amount detection unit,
wherein, when switching the control from the positional control to the hydraulic control by the control switching unit, the control unit calculates a target hydraulic pressure for the hydraulic pressure to be generated by the master cylinder according to a difference between the operation amount detected by the operation amount detection unit when the hydraulic detection unit detects a preset predetermined hydraulic pressure at which the hydraulic pressure generated by the master cylinder can be detected, and a reference operation amount at the time of the predetermined hydraulic pressure in the reference hydraulic characteristic, and
wherein the control unit controls the electric motor in such a manner that the hydraulic value detected by the hydraulic detection unit matches the target hydraulic pressure during the hydraulic control.

2. The brake control apparatus according to claim 1, wherein the control switching unit switches the control between the positional control and the hydraulic control according to the hydraulic value detected by the hydraulic detection unit.

3. The brake control apparatus according to claim 2, wherein the predetermined hydraulic pressure is a preset switching reference hydraulic pressure, and
wherein the control switching unit switches the control from the positional control to the hydraulic control when the hydraulic value detected by the hydraulic detection unit reaches the switching reference hydraulic pressure.

4. The brake control apparatus according to claim 3, wherein the control switching unit includes a switching reference operation amount calculation unit configured to calculate an operation amount with respect to the switching reference hydraulic pressure that is set in the reference hydraulic characteristic when the hydraulic value detected by the hydraulic detection unit reaches the switching reference hydraulic pressure, and
wherein the switching reference operation amount calculation unit calculates a switching reference operation amount with respect to the switching reference hydraulic pressure that is set in the reference hydraulic characteristic, when the hydraulic value detected by the hydraulic detection unit reaches the switching reference hydraulic pressure.

5. The brake control apparatus according to claim 4, wherein the control switching unit includes a switching operation amount deviation calculation unit configured to calculate a switching operation amount deviation with respect to the operation amount detected by the operation amount detection unit and the switching reference operation amount calculated by the switching reference operation amount calculation unit, and
wherein the switching operation amount deviation calculation unit calculates a deviation between the operation amount detected by the operation amount detection unit and the switching reference operation amount calculated by the switching reference operation amount calculation unit as the switching operation amount deviation.

6. The brake control apparatus according to claim 5, wherein the control switching unit includes an operation amount change processing unit configured to change the operation amount detected by the operation amount detection unit with use of the switching operation amount deviation calculated by the switching operation amount deviation calculation unit when the target hydraulic pressure is calculated from the operation amount detected by the operation amount detection unit based on the reference hydraulic characteristic, and
wherein the operation amount change processing unit calculates the target hydraulic pressure from the reference hydraulic characteristic by changing the operation amount detected by the operation amount detection unit according to the switching operation amount deviation from the operation amount detected by the operation amount detection unit, when the target hydraulic pressure is calculated from the operation amount detected by the operation amount detection unit based on the reference hydraulic characteristic.

7. The brake control apparatus according to claim 5, wherein the control switching unit includes a switching operation amount deviation storage unit configured to store the switching operation amount deviation into a storage device when the switching operation amount deviation calculation unit calculates the switching operation amount deviation, and wherein the switching operation amount deviation storage unit stores the switching operation amount deviation as an operation amount deviation.

8. The brake control apparatus according to claim 7, wherein the control switching unit includes a switching operation amount deviation limit unit configured to use an upper or lower limiter or a change width limiter when the switching operation amount deviation is stored by the switching operation amount deviation storage unit, and wherein the switching operation amount deviation limit unit limits the switching operation amount deviation to be stored by the switching operation amount deviation storage unit by limiting the switching operation amount deviation by an upper limit or a lower limit or limiting a change width from the already stored operation amount deviation with use of the upper or lower limiter or the change width limiter, when the switching operation amount deviation is stored by the switching operation amount deviation storage unit.

9. The brake control apparatus according to claim 7, wherein the control switching unit includes an operation amount change processing unit configured to change the operation amount detected by the operation amount detection unit with use of the operation amount deviation stored by the switching operation amount deviation storage unit when the target hydraulic pressure is calculated from the operation amount detected by the operation amount detection unit based on the reference hydraulic characteristic, and wherein the operation amount change processing unit calculates the target hydraulic pressure from the reference hydraulic characteristic by changing the operation amount detected by the operation amount detection unit according to the operation amount deviation from the operation amount detected by the operation amount detection unit, when the target hydraulic pressure is calculated from the operation amount detected by the operation amount detection unit based on the reference hydraulic characteristic.

10. A brake control apparatus comprising:
an electric motor configured to be usable to move a piston of a master cylinder;
an operation amount detection unit configured to detect an operation amount of a brake pedal;
a piston position detection unit configured to detect a piston position in the master cylinder; and
a control unit configured to control the electric motor based on the operation amount detected by the operation amount detection unit,
wherein, in the control unit, a reference position characteristic and a reference hydraulic characteristic are set, the reference position characteristic indicating a preset relationship between the operation amount and the piston position, the reference hydraulic characteristic indicating a relationship between the operation amount and a hydraulic value generated in the master cylinder, which is detected by a hydraulic detection unit,
wherein the control unit includes a control switching unit configured to switch control between positional control of controlling the electric motor based on the reference position characteristic with respect to the operation amount detected by the operation amount detection unit, and hydraulic control of controlling the electric motor based on the reference hydraulic characteristic with respect to the operation amount detected by the operation amount detection unit,
wherein, when switching the control from the positional control to the hydraulic control by the control switching unit, the control unit calculates a target hydraulic pressure for the hydraulic pressure to be generated by the master cylinder according to a difference between the hydraulic value detected by the hydraulic detection unit when the operation amount detection unit detects a preset predetermined operation amount at which the hydraulic pressure can be generated by the master cylinder, and a reference hydraulic pressure at the time of the predetermined operation amount in the reference hydraulic characteristic, and
wherein the control unit controls activation of the electric motor in such a manner that the hydraulic value detected by the hydraulic detection unit matches the target hydraulic pressure during the hydraulic control.

11. The brake control apparatus according to claim 10, wherein the control switching unit switches the control between the positional control and the hydraulic control according to the operation amount detected by the operation amount detection unit.

12. The brake control apparatus according to claim 11, wherein the predetermined operation amount pressure is a preset switching reference operation amount, and wherein the control switching unit switches the control from the positional control to the hydraulic control when the operation amount detected by the operation amount detection unit reaches the switching reference operation amount.

13. The brake control apparatus according to claim 12, wherein the control switching unit includes a switching reference hydraulic calculation unit configured to calculate a hydraulic value with respect to the switching reference operation amount that is set in the reference hydraulic characteristic when the operation amount detected by the operation amount detection unit reaches the switching reference operation amount, and wherein the switching reference hydraulic calculation unit calculates a switching reference hydraulic pressure with respect to the switching reference operation amount that is set in the reference hydraulic characteristic, when the operation amount detected by the operation amount detection unit reaches the switching reference operation amount.

14. The brake control apparatus according to claim 13, wherein the control switching unit includes a switching hydraulic deviation calculation unit configured to calculate a deviation with respect to the hydraulic value detected by the hydraulic detection unit and the switching reference hydraulic pressure calculated by the switching reference hydraulic calculation unit, and wherein the switching hydraulic deviation calculation unit calculates the deviation between the hydraulic value detected by the hydraulic detection unit and the switching reference hydraulic pressure calculated by the switching reference hydraulic calculation unit as a switching hydraulic deviation.

15. The brake control apparatus according to claim 14, wherein the control switching unit includes a hydraulic change processing unit configured to change the hydraulic value calculated from the operation amount detected by the operation amount detection unit based on the reference hydraulic characteristic with use of the switching hydraulic deviation calculated by the switching hydraulic deviation calculation unit when the target hydraulic pressure is calculated from the operation amount detected by the operation amount detection unit based on the reference hydraulic characteristic, and wherein the hydraulic change processing unit calculates the target hydraulic pressure from the reference hydraulic characteristic by changing the target hydraulic pressure calculated from the operation amount detected by the operation amount detection unit based on the reference hydraulic characteristic according to the switching hydraulic deviation calculated by the switching hydraulic deviation calculation unit, as the hydraulic value calculated from the operation amount detected by the operation amount detection unit based on the reference hydraulic characteristic.

16. The brake control apparatus according to claim 14, wherein the control switching unit includes a switching hydraulic deviation storage unit configured to store the switching hydraulic deviation into a storage device when the switching hydraulic deviation calculation unit calculates the switching hydraulic deviation, and wherein the switching hydraulic deviation storage unit stores the switching hydraulic deviation as a hydraulic deviation.

17. The brake control apparatus according to claim 16, wherein the control switching unit includes a switching hydraulic deviation limit unit configured to use an upper or lower limiter or a change width limiter when the switching hydraulic deviation is stored by the switching hydraulic deviation storage unit, and wherein the switching hydraulic deviation limit processing limits the switching hydraulic deviation to be stored by the switching hydraulic deviation storage unit by limiting the switching hydraulic deviation by an upper limit or a lower limit or limiting a change width from the already stored hydraulic deviation with use of the upper or lower limiter or the change width limiter and then calculating the hydraulic deviation, when the switching hydraulic deviation is stored by the switching hydraulic deviation storage unit.

18. The brake control apparatus according to claim 16, wherein the control switching unit includes a hydraulic change processing unit configured to change the hydraulic value calculated from the operation amount detected by the operation amount detection unit based on the reference hydraulic characteristic with use of the hydraulic deviation stored by the switching hydraulic deviation storage unit when the target hydraulic pressure is calculated from the operation amount detected by the operation amount detection unit based on the reference hydraulic characteristic, and wherein the hydraulic change processing unit calculates the target hydraulic pressure from the reference hydraulic characteristic by changing the hydraulic value calculated from the operation amount detected by the operation amount detection unit based on the reference hydraulic characteristic according to the hydraulic deviation stored by the switching hydraulic deviation storage unit from the hydraulic value calculated from the operation amount detected by the operation amount detection unit based on the reference hydraulic characteristic.

* * * * *